US008871335B2

(12) United States Patent
Anderson et al.

(10) Patent No.: US 8,871,335 B2
(45) Date of Patent: Oct. 28, 2014

(54) SOLAR CONTROL LAMINATE

(75) Inventors: Jerrel C. Anderson, Vienna, WV (US); Richard A. Fugiel, Washington, WV (US); Richard A. Hayes, Beaumont, TX (US); Lee A. Silverman, Newark, DE (US)

(73) Assignee: Kuraray America Inc., Houston, TX (US)

( * ) Notice: Subject to any disclaimer, the term of this patent is extended or adjusted under 35 U.S.C. 154(b) by 0 days.

(21) Appl. No.: 11/512,814

(22) Filed: Aug. 30, 2006

(65) Prior Publication Data
US 2007/0048519 A1 Mar. 1, 2007

Related U.S. Application Data

(60) Provisional application No. 60/713,054, filed on Aug. 31, 2005, provisional application No. 60/713,056, filed on Aug. 31, 2005, provisional application No. 60/721,913, filed on Sep. 29, 2005, provisional application No. 60/721,719, filed on Sep. 29, 2005, provisional application No. 60/721,797, filed on Sep. 29, 2005.

(51) Int. Cl.
| B32B 5/16 | (2006.01) |
| B32B 7/02 | (2006.01) |
| B32B 27/00 | (2006.01) |
| B32B 27/18 | (2006.01) |
| B32B 17/10 | (2006.01) |
| B32B 27/30 | (2006.01) |
| B32B 27/32 | (2006.01) |
| B32B 27/08 | (2006.01) |
| B32B 27/40 | (2006.01) |
| B32B 27/36 | (2006.01) |
| B32B 27/16 | (2006.01) |

(52) U.S. Cl.
CPC ........... *B32B 17/10743* (2013.01); *B32B 27/18* (2013.01); *B32B 2307/54* (2013.01); *B32B 2255/10* (2013.01); *B32B 2605/00* (2013.01); *B32B 2264/102* (2013.01); *B32B 2255/26* (2013.01); *B32B 17/10788* (2013.01); *B32B 27/306* (2013.01); *B32B 2419/04* (2013.01); *B32B 27/304* (2013.01); *B32B 27/32* (2013.01); *B32B 17/10* (2013.01); *B32B 2367/00* (2013.01); *B32B 17/10018* (2013.01); *B32B 27/08* (2013.01); *B32B 2255/20* (2013.01); *B32B 2250/24* (2013.01); *B32B 27/40* (2013.01); *B32B 2307/412* (2013.01); *B32B 2307/518* (2013.01); *B32B 2307/42* (2013.01); *B32B 2551/00* (2013.01); *B32B 2605/006* (2013.01); *B32B 17/10761* (2013.01); *B32B 27/36* (2013.01); *B32B 17/10036* (2013.01); *B32B 27/16* (2013.01)
USPC ........ 428/216; 428/411.1; 428/323; 428/339; 428/213; 428/109; 428/480; 428/523; 428/500; 428/522; 428/475.5

(58) Field of Classification Search
USPC .............. 428/328, 323, 432, 195.1, 216; 136/263; 359/360; 252/587; 257/40
See application file for complete search history.

(56) References Cited

U.S. PATENT DOCUMENTS

| 4,339,567 | A | | 7/1982 | Green et al. |
| 4,383,025 | A | | 5/1983 | Green et al. |
| 4,398,014 | A | | 8/1983 | Green et al. |
| 4,624,912 | A | | 11/1986 | Zweifel et al. |
| 4,868,288 | A | | 9/1989 | Meier |
| 5,376,308 | A | | 12/1994 | Hirai et al. |
| 5,518,810 | A | | 5/1996 | Nishihara et al. |
| 5,654,090 | A | | 8/1997 | Kayanoki |
| 5,690,994 | A | * | 11/1997 | Robinson ...................... 427/171 |
| 5,733,823 | A | * | 3/1998 | Sugioka et al. ............... 442/110 |
| 5,742,118 | A | | 4/1998 | Endo et al. |
| 5,807,511 | A | | 9/1998 | Kunimatsu et al. |
| 5,830,568 | A | | 11/1998 | Kondo |
| 5,956,175 | A | * | 9/1999 | Hojnowski ..................... 359/360 |
| 6,060,154 | A | | 5/2000 | Adachi et al. |
| 6,084,007 | A | | 7/2000 | Narukawa et al. |
| 6,191,884 | B1 | | 2/2001 | Takizawa et al. |
| 6,221,945 | B1 | | 4/2001 | Kuno et al. |
| 6,261,684 | B1 | | 7/2001 | Takahashi et al. |
| 6,277,187 | B1 | | 8/2001 | Kuno et al. |
| 6,294,251 | B1 | * | 9/2001 | Minagawa et al. ........... 428/354 |
| 6,315,848 | B1 | | 11/2001 | Kondo |
| 6,319,613 | B1 | * | 11/2001 | Takeda et al. ................. 428/412 |

(Continued)

FOREIGN PATENT DOCUMENTS

| EP | 0 035 969 | 2/1985 |
| EP | 0 044 274 | 9/1985 |

(Continued)

OTHER PUBLICATIONS

PCT International Search Report and Written Opinion for International Application No. PCT/US2006/033984 dated Apr. 23, 2007.

*Primary Examiner* — Ellen S Raudenbush
*Assistant Examiner* — Anthony J Frost
(74) *Attorney, Agent, or Firm* — Oblon, Spivak, McClelland, Maier & Neustadt, L.L.P.

(57) ABSTRACT

Provided are solar control laminates comprising a solar control film and a polymeric sheet. The solar control film comprises a polymeric film coated with a coating comprising inorganic infrared absorbing nanoparticles. Preferably, inorganic infrared absorbing nanoparticles comprise nanoparticles of antimony tin oxide (ATO), indium tin oxide (ITO), lanthanum hexaboride ($LaB_6$) or mixtures thereof. Optionally, the solar control laminate also comprises a rigid sheet, such as a glass sheet.

19 Claims, No Drawings

(56) References Cited

U.S. PATENT DOCUMENTS

| | | |
|---|---|---|
| 6,329,061 B2 | 12/2001 | Kondo |
| 6,404,543 B1 | 6/2002 | Shoshi et al. |
| 6,432,522 B1 * | 8/2002 | Friedman et al. ............ 428/212 |
| 6,506,487 B2 | 1/2003 | Nagai |
| 6,528,156 B1 | 3/2003 | Takizawa et al. |
| 6,579,608 B1 | 6/2003 | Kondo |
| 6,620,477 B2 | 9/2003 | Nagai |
| 6,632,274 B2 | 10/2003 | Kawamoto et al. |
| 6,663,950 B2 | 12/2003 | Barth et al. |
| 6,673,456 B1 | 1/2004 | Kobata et al. |
| 6,686,032 B1 | 2/2004 | Nagai |
| 6,733,872 B2 | 5/2004 | Nagai |
| 2002/0086926 A1 | 7/2002 | Fisher |
| 2004/0028920 A1 | 2/2004 | Fujita et al. |
| 2004/0071957 A1 | 4/2004 | Fujita |
| 2004/0131845 A1 | 7/2004 | Fujita |
| 2005/0238923 A1 * | 10/2005 | Thiel ........................... 428/701 |

FOREIGN PATENT DOCUMENTS

| | | |
|---|---|---|
| EP | 0 054 509 | 4/1986 |
| EP | 0 094 914 | 9/1986 |
| EP | 0 094 915 | 1/1987 |
| EP | 0 164 314 | 1/1988 |
| EP | 0 153 904 | 9/1988 |
| EP | 1 154 000 A1 | 11/2001 |
| EP | 1 188 551 A1 | 3/2002 |
| EP | 1 227 070 A1 | 7/2002 |
| EP | 1 235 683 B1 | 8/2003 |
| EP | 0 947 566 B1 | 3/2004 |
| EP | 1 529 632 A1 | 5/2005 |
| EP | 1 008 564 B1 | 4/2006 |
| EP | 1 724 110 A1 | 11/2006 |
| JP | 11-320769 A | 11/1999 |
| JP | 2000-117906 A | 4/2000 |
| JP | 2002-514533 A | 5/2002 |
| JP | 2002-301785 A | 10/2002 |
| JP | 2003-252656 A | 9/2003 |
| JP | 2004-520186 A | 7/2004 |
| JP | 2005-181966 A | 7/2005 |
| JP | 2007-509785 A | 4/2007 |
| JP | 2007-514050 A | 5/2007 |
| WO | WO 91/01880 | 2/1991 |
| WO | WO 96/28504 | 9/1996 |
| WO | WO 98/28663 | 7/1998 |
| WO | WO 01/00404 A1 | 1/2001 |
| WO | 02-41041 A3 | 5/2002 |
| WO | WO 02/060988 A1 | 8/2002 |
| WO | 02/078885 A1 | 10/2002 |
| WO | WO 03/057478 A1 | 7/2003 |
| WO | WO 2006/008518 A1 | 1/2006 |
| WO | WO 2006/074168 A2 | 7/2006 |
| WO | WO 2006/128090 A2 | 11/2006 |

* cited by examiner

SOLAR CONTROL LAMINATE

CROSS-REFERENCE TO RELATED APPLICATIONS

This application claims priority under 35 U.S.C. § 119 to U.S. Provisional Application No. 60/713,054, filed Aug. 31, 2005; U.S. Provisional Application No. 60/713,056, filed Aug. 31, 2005; U.S. Provisional Application No. 60/721,913, filed Sep. 29, 2005; U.S. Provisional Application No. 60/721,719, filed Sep. 29, 2005; U.S. Provisional Application No. 60/721,797, filed Sep. 29, 2005, each of which is incorporated herein by reference in its entirety.

BACKGROUND OF THE INVENTION

1. Field of the Invention

The present invention pertains to the field of devices that reduce the transmission of radiation, and particularly to devices that reduce the transmission of infrared light.

2. Description of the Related Art

Several patents and publications are cited in this description in order to more fully describe the state of the art to which this invention pertains. The entire disclosure of each of these patents and publications is incorporated by reference herein.

Glass laminated products or safety glass have contributed to society for almost a century. Safety glass is characterized by high impact and penetration resistance, and by minimal scattering of glass shards and debris upon shattering. The laminates typically consist of a sandwich of an interlayer that is a polymeric film or sheet, and that is placed between two glass sheets or panels. One or both of the glass sheets may be replaced with optically clear rigid or non-rigid polymeric sheets such as, for example, sheets of polycarbonate materials or polyester films. Safety glass has further evolved to include more than two layers of glass and/or polymeric sheets bonded together with more than one interlayer.

The interlayer is typically made with a relatively thick polymer film or sheet that exhibits toughness and adheres to the glass in the event of a crack or crash. Over the years, a wide variety of polymeric interlayers have been developed for glass laminated products. In general, it is desirable that these polymeric interlayers possess acceptable levels of: optical clarity, impact resistance, penetration resistance, ultraviolet light resistance, long term thermal stability, adhesion to glass and/or other rigid polymeric sheets, ultraviolet light transmittance, moisture absorption, moisture resistance, long term weatherability, and haze of less than 4%, among other characteristics.

Widely used interlayer materials include complex multi-component compositions comprising polymers such as: polyvinylbutyral (PVB), polyurethane (PU), polyvinylchloride (PVC), metallocene-catalyzed linear low density polyethylenes (mPE), ethylenevinyl acetate (EVA), ethylene acid copolymer ionomers, polymeric fatty acid polyamides, polyester resins such as poly(ethylene terephthalate) (PET), silicone elastomers, epoxy resins, and elastomeric polycarbonates. The use of acid copolymers in fabricating transparent laminates has become more widespread.

Beyond the well known safety glass commonly used in automotive windshields, glass laminates are incorporated as windows into trains, airplanes, ships, and nearly every other mode of transportation. The architectural use of safety glass has also expanded rapidly in recent years, as designers incorporate more glass surfaces into buildings. In addition to their desirable aesthetic features, glass laminated products have now attained the strength required for weight bearing structures such as, for example, the glass staircases and balustrades featured in many newer buildings.

The newer safety glass products are also designed to resist natural and man made disasters. Examples include the recent development of the hurricane resistant glass that is now mandated in many hurricane susceptible areas, theft resistant glazings, and blast resistant glass laminated products. These products have enough strength to resist intrusion even after the frangible portion of the laminate has been broken, for example by high force winds, or by impact of flying debris, or by a criminal attempting to break into a building or vehicle.

Society continues to demand more functionality from laminated glass products beyond its optical and decorative capabilities and the safety characteristics described above. One desirable goal is the reduction of energy consumption within structures, such as automobiles or buildings, for example, through the development of solar control glazing. Because the near infrared spectrum is not sensed by the human eye, a typical approach has been to develop glass laminates that prevent a portion of solar energy from the near infrared spectrum from entering the structure. For example, the energy expended on air conditioning may be reduced, without a reduction or distortion of the transmitted visible light spectrum, in structures equipped with solar control windows that block a portion of the near infrared spectrum.

Solar control in glass laminates may be achieved through modification of the glass or of the polymeric interlayer, by the addition of further solar control layers, or combinations of these approaches. One form of solar control laminated glass includes metallized substrate films, such as polyester films, which have electrically conductive metal layers, such as aluminum or silver metal. The metallized films generally reflect light of the appropriate wavelengths to provide adequate solar control properties. Metallized films, however, are commonly manufactured by vacuum deposition or sputtering processes that require a high vacuum apparatus and a precision atmosphere controlling system.

In addition to infrared light, metallized films also reflect certain radio wavelengths, thus impairing the function of radio, television, global positioning systems (GPS), automated toll collection, keyless entry, communication systems, automatic garage openers, automated teller machines, radio frequency identification (RFID), and like systems commonly used in automobiles or other structures that may be protected by solar control laminated glass. This impairment is a direct result of the metal layers being continuous and, therefore, electrically conductive.

Finally, moisture intrusion into sputtered metal coated films during and after the glass lamination process requires additional, complicated processes to allow for edge deletions from the interlayer. To overcome these problems and others, metallized films have been used as inner layers in laminated glass structures. This type of structure complicates the manufacturing processes.

A more recent trend has been the use of metal oxide nanoparticles that absorb rather than reflect infrared light. To preserve the clarity and transparency of the substrate, these materials ideally have nominal particle sizes below about 200 nanometers (nm). Because these materials do not form electrically conductive films, the operation of radiation transmitting and receiving equipment located inside structures protected by this type of solar control glazing is not impeded.

Two infrared absorbing metal oxides that have attained commercial significance are indium tin oxide and antimony tin oxide. Several film substrates coated with antimony tin oxide and/or indium tin oxide have been described as solar control window coverings. See, for example, U.S. Pat. No.

5,518,810. The metal oxide particles may be adhered to windows as a window covering with a thin layer of contact adhesive. See, for example, U.S. Pat. Nos. 6,191,884; 6,261,684 and 6,528,156.

Lanthanum hexaboride is another example of an infrared absorbing inorganic compound that has attained commercial significance. Lanthanum hexaboride is reported to be more efficient than other inorganic infrared absorbing nanoparticles, such as antimony tin oxide and indium tin oxide, for example. Therefore, equivalent solar control performance may be obtained at a relatively low level of nanoparticles.

Several film substrates coated with lanthanum hexaboride have been described as solar control window coverings. See, for example, U.S. Pat. Nos. 6,060,154; 6,221,945; 6,277,187; and 6,319,613; and European Patent No. 1 008 564. Moreover, lanthanum hexaboride has been used in combination with antimony tin oxide and indium tin oxide in a hardcoat layer of a window covering. See, for example, U.S. Pat. No. 6,663,950.

Window coverings, however, suffer the shortcomings of being unstable to aging and environmental stresses such as cleaning. Over time they may develop scratches or stress cracks on the film. They may also form bubbles or otherwise develop partial or total lack of adhesion to the window from, for example, humidity, heat or both.

Therefore, nanoparticles have been incorporated into the polymeric interlayers of glass laminates. Generally, the nanoparticles are introduced into the polymeric materials as a dispersion in a vehicle such as a plasticizer, a solvent, or another liquid. Alternatively, ultrafine metal oxide particles have been introduced directly into a polymer melt at the end concentration desired for the infrared absorbing interlayer. See, for example, U.S. Pat. Nos. 5,830,568; 6,315,848; 6,329,061; 6,579,608; 6,506,487; 6,620,477; 6,686,032; 6,632,274; 6,673,456; and 6,733,872; U.S. Appln. Pubin. Nos. 2004/0071957; 2004/0131845; and 2004/0028920 and Internatl. Appln. Publn. No. WO 02/060988. The addition of the nanoparticles into the polymeric interlayers necessarily complicates the processes by which these laminates are produced.

It remains desirable to provide new devices that reduce transmission of infrared energy without impeding radio frequency transmission.

SUMMARY OF THE INVENTION

The present invention provides a solar control laminate comprising a solar control film and a polymeric sheet. The solar control film comprises a polymeric film at least partially coated with a coating comprising inorgainic infrared absorbing nanoparticles and a matrix material that serves to bind the nanoparticles to the polymeric film. Preferably, the polymeric film is a biaxially oriented poly(ethylene terephthalate) film. Preferably, the inorganic nanoparticles comprise nanoparticles of antimony tin oxide (ATO), indium tin oxide (ITO), lanthanum hexaboride ($LaB_6$) or mixtures thereof.

In one embodiment, the polymeric sheet comprises a material with a modulus of about 20,000 psi (138 MPa) or less as measured by ASTM Method D-638. Preferably, in this embodiment, the polymeric sheet comprises poly(ethylene-co-vinyl acetate), poly(vinyl butyral), or a combination of poly(ethylene-co-vinyl acetate) and poly(vinyl butyral).

In a second embodiment, the polymeric sheet comprises a material with a modulus of about 20,000 psi (138 MPa) to about 100,000 psi (690 MPa) as measured by ASTM Method D-638. Preferably, in this embodiment, the polymeric sheet comprises an ethylene acid copolymer composition or an ionomer derived from an ethylene acid copolymer composition.

The polymeric film has a thickness of about 0.1 mils (0.003 mm) to about 10 mils (0.25 mm). The polymeric sheet has a thickness of about 10 mils (0.25 mm) or greater.

Optionally, the solar control laminate also comprises a rigid sheet, such as a glass sheet, for example.

DETAILED DESCRIPTION OF THE INVENTION

The definitions herein apply to the terms as used throughout this specification, unless otherwise limited in specific instances.

The term "nanoparticles", as used hereinafter, refers to infrared absorptive inorganic nanoparticles.

The term "solar control", as used herein, refers to reducing the intensity of any wavelength of radiation emitted by the sun. Preferably, in present invention, the intensity of an infrared or near infrared wavelength is reduced. Also preferably, the intensity of visible wavelengths is substantially unchanged. Advantageously, under these two preferred conditions, the transmission of heat is reduced, while visual transparency is maintained and the appearance of colored objects is not substantially distorted.

The term "(meth)acrylic acid", as used herein, refers to acrylic acid or methacrylic acid, or to a mixture of acrylic acid and methacrylic acid. Likewise, the term "(meth)acrylate", as used herein, refers to a salt or ester of acrylic acid, methacrylic acid, or a mixture of acrylic acid and methacrylic acid.

The terms "finite amount" and "finite value", as used herein, refer to an amount or value that is not equal to zero.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and other factors that will be apparent to those of skill in the art. In general, an amount, size, formulation, parameter or other quantity or characteristic is "about" or "approximated" whether or not expressly stated to be such.

The term "or", when used alone herein, is inclusive; more specifically, the phrase "A or B" means "A, B, or both A and B". Exclusive "or" is designated herein by terms such as "either A or B" and "one of A or B", for example.

All percentages, parts, ratios, and the like set forth herein are by weight, unless otherwise limited in specific instances.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

The solar control laminates of the invention comprise a solar control film and a polymeric sheet. The solar control film and the polymeric sheet are laminated directly to each other so that they are adjoining or, preferably, contiguous. In certain preferred embodiments, the solar control laminates consist essentially of a solar control film and a polymeric sheet.

The solar control film comprises a polymeric film and a nanoparticle-containing coating. The polymeric film is at least partially coated by the nanoparticle-containing coating on one or both of its sides.

Essentially any polymer may find utility in the polymeric film. Preferably the polymeric film is transparent. Preferred materials for the polymeric film include, without limitation, poly(ethylene terephthalate), polycarbonate, polypropylene, polyethylene, polypropylene, cyclic polyloefins, norbornene polymers, polystyrene, syndiotactic polystyrene, styrene-acrylate copolymers, acrylonitrile-styrene copolymers, poly (ethylene naphthalate), polyethersulfone, polysulfone, nylons, poly(urethanes), acrylics, cellulose acetates, cellulose triacetates, vinyl chloride polymers, polyvinyl fluoride, and polyvinylidene fluoride. More preferably, the polymeric film is biaxially oriented poly(ethylene terephthalate) film.

The thickness of the polymeric film preferably ranges from about 0.1 mils (0.003 mm) to about 10 mils (0.25 mm), and more preferably from about 0.5 mils (0.013 mm) to about 8.0 mils (0.20 mm). In general, the thickness of the polymeric film is not critical and may be varied depending on the particular requirements of the application. For automobile windshields, however, the polymeric film thickness is preferably within the range of about 1 mil (0.025 mm) to about 4 mils (0.1 mm).

The polymeric film is preferably formed by solution casting, extrusion casting or blown film extrusion. Multilayer films are also suitable for use in the invention. Optionally, at least one of the layers comprises nanoparticles. The multilayer film structures may be formed by the means described below for the multilayer sheet; however, they are generally produced through extrusion casting or blown film extrusion processes.

The film properties may be further adjusted by adding certain additives and fillers to the polymeric composition. The suitable additives, fillers, and levels are as described below for polymeric sheets. In addition, the polymeric films may be treated with the same post-extrusion operations as the polymeric sheets.

Preferably, one or both surfaces of the polymeric film is treated to enhance adhesion. This treatment may take any suitable form, including, without limitation, adhesives, primers including silanes, flame treatments, plasma treatments, electron beam treatments, oxidation treatments, corona discharge treatments, chemical treatments, chromic acid treatments, hot air treatments, ozone treatments, ultraviolet light treatments, sand blast treatments, solvent treatments, and combinations thereof. Adhesives and primers are preferred treatments for films.

Essentially any adhesive is suitable for use in the present invention. Specific examples of preferred adhesives include, without limitation, gamma-aminopropyl-triethoxysilane, N-beta-(aminoethyl)-gamma-aminopropyl-trimethoxysilane, and mixtures thereof. Preferred adhesives that are commercially available include, for example, Silquest™ A-1100 silane, available from GE Silicones-OSi Specialties of Wilton, Conn., and believed to be gamma-aminopropyltrimethoxysilane, and Z-6020™ silane, available from the Dow Corning Corporation of Midland, Mich. The adhesives may be applied through melt processes or through coating processes, such as solution coating, emulsion coating, and dispersion coating.

Likewise, essentially any primer is suitable for use in the present invention. Preferred primers include polyallylamine-based primers. One polyallylamine-based primer and its application to poly(ethylene terephthalate) polymeric films are described in U.S. Pat. Nos. 5,411,845; 5,770,312; 5,690,994; and 5,698,329. More preferably, both surfaces of the polymeric film are coated with a primer.

When using an adhesive or primer, one of ordinary skill in the art will be able to identify appropriate coating thicknesses and process parameters based on the composition of the polymer film, and of the adhesive or primer, and on the coating process.

The coating includes inorganic infrared absorptive nanoparticles and a matrix material or binder. The nanoparticles preferably comprise a metal, a metal containing compound, a metal containing composite, or a mixture of two or more substances selected from metals, metal containing compounds, and metal containing composites. Suitable metals include, without limitation, tin, zinc, zirconium, iron, chromium, cobalt, cerium, indium, nickel, silver, copper, platinum, manganese, tantalum, tungsten, vanadium, antimony, molybdenum, lanthanides and actinides. Suitable metal containing compounds include, without limitation, oxides, borides, nitrides, oxynitrides, phosphates and sulfides. Suitable metal containing composites include metals doped with at least one doping substance and metal containing compounds doped with at least one doping substance. Suitable doping substances include, without limitation, antimony, antimony compounds, fluorine, fluorine compounds, tin, tin compounds, titanium, titanium compounds, silicon, silicon compounds, aluminum and aluminum compounds.

The metal borides include the lanthanide series hexaborides, strontium and calcium hexaboride, and borides of titanium, zirconium, hafnium, vanadium, tantalum, chromium, molybdenum, tungsten and mixtures thereof.

Preferably, the nanoparticles comprise nanoparticles of antimony tin oxide (ATO), indium tin oxide (ITO), lanthanum hexaboride (LaB$_6$) or mixtures thereof, i.e. mixtures of any two or of all three of these preferred nanoparticles.

Antimony tin oxide can be described as antimony-doped tin oxide, or as tin oxide containing a relatively small amount of antimony oxide. The amount of antimony is preferably in the range of about 0.1 weight percent to about 20 weight percent, more preferably about 5 weight percent to about 15 weight percent, based on the total weight of the antimony tin oxide. Still more preferred is tin oxide doped with antimony oxide in the range of about 8 weight percent to about 10 weight percent.

Indium tin oxide, in contrast, can be described as tin-doped indium oxide, or as indium oxide containing a relatively small amount of tin oxide. The amount of tin is preferably in the range of from about 1 to about 15 atomic percent and more preferably from about 2 to about 12 atomic percent based on the sum of tin and indium atoms. Alternatively stated, the molar fraction of the tin content in the ITO powder, (moles Sn)/[(moles Sn)+(moles In)], is preferably from about 0.01 to about 0.15. More preferably, the molar fraction of the tin content is from about 0.02 to about 0.12.

Suitable nanoparticles have a nominal or average particle size of less than about 200 nanometers (nm). Preferably, the nanoparticles have a nominal particle size of less than about 100 nm. More preferably, the nanoparticles have a nominal particle size of less than about 50 nm. Still more preferably, the nanoparticles have a nominal particle size of less than about 30 nm. Most preferably, the nanoparticles have a nominal particle size within the range of about 1 nm to about 20 nm.

The nanoparticles may be surface treated with a silane compound, a titanium compound or a zirconium compound, to improve properties such as water resistance, thermal oxidative stability and dispersability.

The amount of nanoparticles in the coating is from about 0.01 to about 80 weight percent, preferably from about 0.01 to about 60 weight percent, more preferably from about 0.01 to about 40 weight percent, and still more preferably from about 0.1 to about 20 weight percent, based on the total weight the coating. One skilled in the art will recognize that the optimal amounts of nanoparticles will depend on the particular materials used and the process used to form of the coating.

The amount of matrix resin in the coating is generally close to the difference between 100% and the amount of nanoparticles in the coating. Those of skill in the art are aware that certain additives contribute to the solids content of the coating. With this proviso, however, the level of matrix resin in the coating may range from about 20 to about 99.99 weight percent, preferably from about 40 to about 99.99 weight percent, more preferably from about 60 to about 99.99 weight percent, and still more preferably from about 80 to about 99.9 weight percent, based on the total weight of the coating.

The nanoparticles may be produced through any suitable process, including vapor phase decomposition methods, plasma vaporizing methods, alkoxide decomposition methods, co-precipitation methods and hydrothermal methods.

The matrix material or binder that incorporates the nanoparticles may be organic or inorganic. The matrix material may include a high polymer, a reactive oligomer, a reactive prepolymer, a reactive monomer and mixtures thereof. Preferably, the matrix material is transparent.

Essentially any polymer may find utility as the matrix material. Preferably, the matrix material is polymeric, and, more preferably, the matrix material comprises a film forming polymer. Preferred polymeric matrix materials include, without limitation, acrylic resins, acrylate resins, urethane resins, urea resins, epoxy resins, phenoxy resins, chlorinated polyether resins, fluorine-containing resins, polyvinyl acetals, polyvinyl formals, silicone resins, ABS resins, poly(vinyl butyral) resins, poly-4-methylpentene, polytrifluoroethylene, polyvinylidene fluoride, olefin polymers and copolymers, poly(ethylene-co-n-butyl acrylate-co-glycidyl acrylate), poly(ethylene-co-methyl acrylate), poly(ethylene-co-ethyl acrylate), poly(ethylene-co-butyl acrylate), poly(ethylene-co-(meth)acrylic acid), metal salts of poly(ethylene-co-(meth)acrylic acid), poly((meth)acrylates), poly(vinyl acetate), poly(ethylene-co-vinyl acetate), poly(vinyl alcohol), poly(ethylene-co-vinyl alcohol), poly(cyclic olefins), polyesters, poly(ethylene terephthalate), poly(1,3-propyl terephthalate), poly(ethylene-co-1,4-cyclohexanedimethanol terephthalate), poly(vinyl chloride) compositions, poly(vinylidene chloride), polystyrene, polyamides, polycarbonates, poly(bisphenol A carbonate), polysulfides, poly(phenylene sulfide), polyethers, poly(2,6-dimethylphenylene oxide), polysulfone resins, starch, starch derivatives, modified starch, thermoplastic starch, cellulose, cellulose derivatives, modified cellulose, cellulose esters, cellulose mixed esters, cellulose ethers, copolymers thereof and mixtures thereof.

Preferably, the nanoparticles are dispersed in the polymeric matrix material by high shear mixing of the molten matrix material with the nanoparticles and other optional components to form the coating. The high shear mixing may be provided by static mixers, rubber mills, Brabender mixers, single screw extruders, twin screw extruders, and heated or unheated two-roll mills. The matrix material may be dried prior to any mixing step. The matrix material may then be mixed with the nanoparticles and the other optional components as a dry blend, typically referred to as a "pellet blend". Alternatively, the matrix material and the nanoparticles may be co-fed through two different feeders. In an extrusion process, the matrix material and the nanoparticles would typically be fed into the back, feed section of the extruder. However, this should not be considered limiting. The matrix material and the nanoparticles may be fed into two different locations of the extruder. For example, the matrix material may be added in the back, feed section of the extruder while the nanoparticles are fed in the front of the extruder near the die plate. Also alternatively, the nanoparticles may be dispersed or suspended in a solvent or a plasticizer by, for example, ball milling, to form a concentrate. The concentrate is then added to the matrix material through an intensive melt mixing process. Generally, the matrix material melt processing temperature will be within the range of about 50° C. to about 300° C. The exact processing conditions will depend on the chemical identity of the matrix material.

Other coating formulations are also suitable for use in the present invention. The coating may result from the application of a coating solution, for example. The term "coating solution" encompasses nanoparticles dispersed or suspended in one or more polymer solutions, one or more emulsion polymers, or mixtures of one or more polymer solutions and one or more emulsion polymers.

The coating solution may include one or more solvents that dissolve, partially dissolve, disperse, or suspend the binder. The solvent or solvent blends are selected by considering such properties as the solubility of the matrix resin, surface tension of the resulting coating solution and evaporation rate of the coating solution, the polarity and surface characteristics of the nanoparticle to be used and the chemical nature of any dispersants and other additives, the viscosity of the coating, and compatibility of the surface tension of the coating with the surface energy film material. The solvent or solvent blend should also be chemically inert to the binder material(s).

Specific examples of useful solvents include, without limitation, methanol, ethanol, n-propanol, isopropanol, n-butanol, isobutanol, tert-butyl alcohol, hexanol, heptanol, 2-ethylhexyl alcohol, lauryl alcohol, stearyl alcohol, cyclopentanol, cyclohexanol, ethylene glycol, diacetone alcohol, benzyl alcohol, para-tert-butylbenzyl alcohol, amyl alcohol, tetrahydrofurfuryl alcohol, acetone, cyclohexanone, methyl ethyl ketone, methyl isobutyl ketone, diethyl ketone, phorone, isophorone, ethylene glycol monomethyl ether, carbitol, ethylene glycol monoethyl ether, 2-butoxy ethanol, propylene glycol monomethyl ether, propylene glycol monoethyl ether, propylene glycol monobutyl ether, methyl carbitol, 1-methoxy-2-propanol, 1-ethoxy-2-propanol, butyl carbitol, butyl carbitol acetate, dioxane, tetrahydrofuran, butyl ether, butyl ethyl ether, diglyme, methyl formate, ethyl formate, methyl acetate, ethyl acetate, n-butyl acetate, ethylene glycol monomethyl ether acetate, 2-methoxyethyl acetate, 2-ethoxyethylacetate, 2-butoxyethyl acetate, 2-methoxypropyl acetate, glycolic acid-n-butyl ester, propylene carbonate, petroleum naphthas, n-butane, hexane, cyclohexane, benzene, toluene, xylene, mesitylene, ethyl benzene, solvent naphtha, N-methyl-2-pyrrolidone, water, N-methylformamide, N,N-dimethyl formamide, N,N-dimethyl acetamide, octane, dichloromethane, chloroform, carbon tetrachloride, diethanolamine, a high boiling petroleum hydrocarbon and mixtures thereof.

Preferred matrix resin loadings within the coating solutions are within the range of about 0.1 to about 40 weight percent based on the total weight of the coating solution. Those of skill in the art are aware that certain additives may be present in the coating solution. With this proviso, however, the amount of solvent in the coating solution is preferably within the range of about 60 to about 99.9 weight percent based on the total weight of the coating solution.

Those of skill in the art are aware that the thickness of the coating is dependent in part on the amount of solvent in the coating solution. Those of skill in the art are also aware that the amount of nanoparticles in the coating solution is determined largely by the amount of binder and solvent in the coating solution, and by the amount of nanoparticles desired in the coating.

To prepare a coating solution, the nanoparticles, the matrix resin, the optional additives and the solvent are mixed to homogeneously distribute the nanoparticles throughout the polymer solution. Alternatively, the matrix resin and the nanoparticles may be kneaded together to form a concentrate, which may, in turn, be added to the solvent as described in Intl. Appln. Publn. No. WO 01/00404 and U.S. Pat. No. 5,487,939. Regardless of how the coating solution is formed, it may be milled, such as through ball milling, roll milling, sand grinding milling, or by using a paint shaker, a kneader, a dissolver, or an ultrasonic dispersing machine to deagglomerate the nanoparticles.

Alternatively, the nanoparticle-containing coating may be an actinic radiation-curable coating comprising one or more radically polymerizable monomers and/or oligomers. Suitable radiation-curable matrix materials are described, for example, in U.S. Pat. No. 5,504,133.

A radiation curable matrix composition preferably also contains at least one photoinitiator. Examples of useful photoinitiators include 1-hydroxycyclohexyl phenyl ketone, benzophenone, benzyl-dimethylketal, benzoin methyl ether, benzoin ethyl ether, p-chlorobenzophenone, 4-benzoyl-4-methyldiphenyl sulfide, 2-benzyl-2-dimethylamino-1-(4-morpholino-phenyl)butanone-1,2-methyl-1-4-(methylthio) phenyl-2-morpholinopropanone-1, diethoxy acetophenone, 2-hydroxy-2-methyl-1-phenylpropan-1-one, 1-hydroxycyclohexyl-phenylketone, 2-methyl-2-monophorino (4-thiomethylphenyl)propan-1-one, benzoin isopropylether, benzoin isobutylether, o-benzoyl ethyl benzoate, 4-phenyl benzophenone, 4-benzoyl4'-methyl-diphenylsulfide, 4-benzoyl-N,N-dimethyl-N-[2-(1-oxo-2-propenyloxy)ethyl] benzene methanaminuim bromide, (4-benzoylbenzyl)trimethyl ammonium chloride, 2,4-diethyl thioxanthone, 1-chloro-4-dichloro thioxanthone, 2,4,6-trimethylbenzoyl diphenylbenzoyl oxide and mixtures thereof. In addition, at least one accelerator or sensitizer, such as an amine compound, e.g., N,N-dimethyl paratoluidine and 4,4'-diethylamino benzophenone, or benzoperylene, 1,8-diphenyl-1,3,5,7-octatetraene, and 1,6-diphenyl-1,3,5-hexatriene may also be used.

Alternatively, the nanoparticle-containing coating may include a photo-cationic-curable matrix material as described in U.S. Pat. No. 6,191,884. Generally, photo-cationically-curable matrix materials are epoxide and/or vinyl ether materials. Suitable cationic photoinitiators for epoxy and vinyl ether resins include onium salts with anions of weak nucleophilicity, halonium salts, iodosyl salts or sulfonium salts, such as are disclosed in European Patent No. 153904 and WO 98/28663, sulfoxonium salts, such as described in European Patent Nos. 35969, 44274, 54509, and 164314, or diazonium salts, such as disclosed in U.S. Pat. Nos. 3,708,296 and 5,002,856. Other cationic photoinitiators are metallocene salts, such as described in European Patent Nos. 94914 and 94915. Specific examples of photo-cationic initiators include mixed triarylsulfonium hexafluoroantimonate salts (for example, Cyracure™ UVI-6974 and Cyracure™ UVI-6990, available from Union Carbide Company, a wholly owned subsidiary of the Dow Chemical Co. of Midland, Mich.), diaryliodonium salts, such as the tetrafluoroborate, hexafulorophosphate, hexafluoroarsenate and hexafluoroantimonate salts, diphenyliodonium hexafluoroantimonate, triaryl sulfonium salts, such as tetrafluoroborate, hexafluorophosphate, hexafluoroarsenate and hexafluoroantimonate salts of triphenylsulfonium, 4-tertiarybutyl triphenylsulfonium, tris(4-methylphenyl)sulfonium, tris(4-methoxyphenyl) sulfonium, and 4-thiophenyltriphenylsulfonium, triphenylsulfonium hexafluorophosphate and mixtures thereof.

One or more photoinitiators and/or photo-cationic initiators may be added to the composition in a total level of from about 0.1 weight percent to about 20 weight percent, preferably from about 0.1 weight percent to about 15.0 weight percent, and more preferably from about 0.1 weight percent to about 10.0 weight percent based on the total weight of the coating composition.

Alternatively, the nanoparticle-containing coating compositions may be cured through heating processes. When a heating process-based cure is desired, it is preferable to incorporate an appropriate radical polymerization initiator, such as azobisisobutyronitrile, in the coating composition in place of a photoinitiator. Preferred heat-curing binders include thermoset resins, such as melamine resin, polyurethane resin, silicone resin, silicone-modified resin and mixtures thereof.

Radiation and heat-curable coating compositions may be made by any suitable process. Typical processes resemble those described above for conventional coating solutions.

Preferably, the matrix material is organic, so that it does not detract from the flexibility of the solar control film. The matrix material may be inorganic. For example, the matrix may be produced through the hydrolysis of the alkoxides of silicon, aluminum, zirconium, titanium and mixtures thereof. The alkoxide group may be methoxide, ethoxide, propoxide, isopropoxide, butoxide, sec-butoxide, tert-butoxide and mixtures thereof. Specific examples of preferred metal alkoxides include silicon tetraethoxide (ethyl silicate or TEOS), aluminum triisopropoxide, zirconium tetrabutoxide and titanium tetraisopropoxide. These metal alkoxides, when dissolved in alcohol containing a nearly stoichiometric amount of water, may be cast onto the polymeric film and, during the drying process, form a transparent inorganic coating comprising the corresponding metal oxide. Acid or base catalysis and/or the application of heat may be necessary to effect the hydrolysis. TEOS, however, may hydrolyze at an appropriate rate in neat water. The inorganic coating composition can be prepared by dispersing the nanoparticles into the alcohol mixture before or after the addition of the inorganic alkoxide(s). Optionally, the coating compositions may also be diluted with one or more other appropriate solvents.

Preferably, the coating will be less than or equal to 0.25 mm (10 mils) thick, more preferably between about 0.025 mm and about 0.15 mm (1 mil and 6 mils). However, thicker coatings can be formed up to a thickness of about 0.50 mm (20 mils) or greater.

The polymeric film may be coated by any suitable coating process. Extrusion is a particularly preferred method of coating polymeric films. Melt extrusion of coatings onto substrates is described, for example, in U.S. Pat. Nos. 5,294,483; 5,475,080; 5,611,859; 5,795,320; 6,183,814 and 6,197,380. In a typical process, the thin molten nascent coating exits the extruders die and is pulled down onto the polymeric film substrate and into a nip between a chill roll and a pressure roll with a rubber surface situated directly below the die. The uncoated side of the polymeric film substrate generally contacts the pressure roll, and the polymer-coated side of the substrate contacts the chill roll. The pressure between these two rolls forces the coating onto the polymeric film substrate and draws the coating down to the desired thickness. The coated polymeric film substrate may then pass through a slitter to trim the edges. The coated film is then taken up in such a way as to minimize any subsequent deformation.

Alternatively, a coating solution may be cast onto the polymeric film and dried to form the solar control film. Solution casting generally produces a more consistent coating thickness than melt extrusion. In a typical process, the coating solution is filtered to remove dirt or large particles and cast from a slot die onto a moving preformed polymeric film substrate, dried, and cooled if necessary. The coating solution thickness, immediately after casting, is typically five to ten times that of the finished coating, depending on the amount of solvent in the coating solution. The coating may then be finished in a like manner to the extruded coating.

Other suitable methods of forming the nanoparticle-containing coating include, without limitation, rolling, spreading, brushing, pouring, using a spinner, bar coating, dip coating, Meir bar, doctor blade, Dahlgren, spray coating and air knife techniques. The coating may also be printed onto the polymeric film by any suitable process, e.g., gravure, flexography, serigraphy, lithography, or roll coating processes. Processes may be used in combination, for example, solution casting followed by thickness adjustment with a doctor blade. Any of these coating methods may optionally be followed by a drying step.

The solar control film, or the solar control laminate of the invention, may also have a hard coat layer formed from an ultraviolet (UV) curing resin on one or both surfaces to protect the outer polymeric layers from scratching, abrasion, and like insults. Any suitable hard coat formulation may be employed. One preferred hard coat is described in U.S. Pat. No. 4,027,073. The hard coat may incorporate further additives or be modified to provide other desirable attributes. High scratch-resistance is provided by the addition of fine particles of $SiO_2$, $TiO_2$, $ZrO_2$, $Al_2O_3$ or MgO that do not substantially affect the transmission of visible light. Antifog properties are provided by the use of hydrophilic monomers, oligomers or surfactants that can act as wetting agents. High gloss is provided by the use of ADEKA OPTMER™ KR-567 available from the Asahi Denka Kogyo K.K. Company. Moisture vapor barrier properties or resistance to polar solvents is provided by monomers, oligomers, or resins containing silicon or fluorine.

Certain solar control films suitable for use in the present invention are commercially available. One example are Raybarriemm (Sumitomo Osaka Cement Company, Chiba, Japan) solar control films, which are believed to include antimony tin oxide nanoparticles with a nominal particle size of about 10 nm dispersed in a matrix material and coated on biaxially oriented poly(ethylene terephthalate) films. Some Raybarrier™ solar control films are also coated with a hard coat to improve their abrasion resistance. Typical reported optical properties of the Raybarriem solar control films are, for example, visible radiation transmittance of 78.9 percent, sunlight radiation transmittance of 66.0 percent, a sunlight reflectance of 8.4 percent, a UV transmittance of 0.4 percent, and a screening factor of 0.8. Another example of commercially available solar control films suitable for use in the present invention are Soft Look™ solar control films (Tomoegawa Paper Company, Ltd., Tokyo, Japan) which are believed to include indium tin oxide nanoparticles dispersed in a matrix material and coated on a biaxially oriented poly(ethylene terephthalate) film. Some Soft Look™ solar control films are also coated with a hard coat to improve their abrasion resistance, and some have outer layers of adhesive. Typical reported optical properties of Soft Look™ solar control films include, for example; a visible radiation transmittance of 85.80 percent, sunlight radiation transmittance of 68.5 percent, a sunlight reflectance of 7.9 percent, and a screening factor of 0.86. Specific grades of Soft Look® solar control films include Soft Look™ UV/IR 25 solar control film and Soft Look™ UV/IR 50 solar control film. Still another example of commercially available solar control films suitable for use in the present invention are "KH" (Sumitomo Metal Mining Company, Tokyo, Japan) solar control films which incorporate lanthanum hexaboride nanoparticles.

The polymeric sheet preferably contributes to one or more of the commonly recognized attributes of a safety glass interlayer, such as, for example, puncture resistance or penetration strength, adhesion to glass, and transparency. Suitable polymeric sheets have a thickness of about 10 mils (0.25 mm) or greater, and preferably about 15 mils (0.38 mm) or greater. In general, penetration strength increases with increasing sheet thickness. Accordingly, when the solar control laminate is intended for use in applications that require enhanced penetration strength, the polymeric sheet has a thickness of about 30 mils (0.75 mm) or greater, more preferably about 50 mils (1.25 mm) or greater. Polymeric sheets whose thickness is greater than 60 mils (1.50 mm), 90 mils (2.25 mm), or 120 mils (3.00 mm) are also suitable for use in the present invention and preferred in applications requiring superior penetration strength.

In one embodiment, the polymeric sheet comprises a material with a modulus of about 20,000 psi (138 MPa) or less, preferably about 15,000 psi (104 MPa) or less as measured by ASTM Method D-638.

Materials for the polymeric sheet of this embodiment include poly(ethylene-co-vinyl acetate), ethyl acrylic acetate (EM), ethyl methacrylate (EMAC), metallocene-catalyzed polyethylene, plasticized poly(vinyl chloride), ISD resins, polyurethanes, acoustic modified poly(vinyl chloride), plasticized poly(vinyl butyral), acoustic modified poly(vinyl butyral) and combinations thereof. The modulus of each of these materials is set forth in U.S. Pat. No. 6,432,522. Recycled polymeric materials may be used in complete or partial substitution for virgin polymeric materials. Poly(vinyl butyral) and poly(ethylene-co-vinyl acetate) are preferred materials.

Poly(vinyl butyral), which may be synthesized by well known methods, has a weight average molecular weight of from about 30,000 to about 600,000 Daltons (D), preferably of from about 45,000 to about 300,000 D, more preferably from about 200,000 to 300,000 D, as measured by size exclusion chromatography using low angle laser light scattering. Preferred poly(vinyl butyral) materials comprise, on a weight basis, about 5 to about 30%, preferably about 11 to about 25%, and more preferably about 15 to about 22% of hydroxyl groups calculated as polyvinyl alcohol (PVOH). In addition, the preferred poly(vinyl butyral) material incorporates a finite amount up to about 10 mole %, and preferably up to about 3 mole %, of residual ester groups calculated as polyvinyl ester, typically acetate groups, with the balance being butyraldehyde acetal. The poly(vinyl butyral) may incorporate a minor amount of acetal groups other than butyral, for example, 2-ethyl hexanal, as described in U.S. Pat. No. 5,137,954.

Preferably, the poly(vinyl butyral) contains at least one plasticizer. The choice of plasticizer(s) and level(s) depends on the specific poly(vinyl butyral) resin and the properties desired. Suitable plasticizers are described in U.S. Pat. Nos. 3,841,890; 4,144,217; 4,276,351; 4,335,036; 4,902,464; and 5,013,779, and Intl. Appln. Publn. No. WO96/28504, for example. Preferred plasticizers are triethylene glycol di-(2-ethyl butyrate), triethylene glycol di-2-ethylhexanoate, triethylene glycol di-n-heptanoate, oligoethylene glycol di-2-ethylhexanoate, tetraethylene glycol di-n-heptanoate, dihexyl adipate, dioctyl adipate, mixtures of heptyl and nonyl adipates, dibutyl sebacate, tributoxyethylphosphate, isodecylphenylphosphate, triisopropylphosphite, polymeric plasticizers such as the oil-modified sebacid alkyds, and mixtures of phosphates and adipates, and adipates and of alkyl benzyl phthalates. Generally between about 15 to about 80 parts of plasticizer per hundred parts of resin, and preferably about 25 to about 45 parts of plasticizer per hundred parts of resin are used. This latter concentration range is generally appropriate for poly(vinyl butyral) resins containing 17 to 25% vinyl alcohol by weight.

The poly(vinyl butyral) may also comprise one or more adhesion control additives, for adjusting the strength of the bond between a glass rigid layer and the polymeric sheet. Adhesion control additives are generally alkali metal or alkaline earth metal salts of organic and inorganic acids. Preferably, they are alkali metal or alkaline earth metal salts of organic carboxylic acids having from 2 to 16 carbon atoms. More preferably, they are magnesium or potassium salts of organic carboxylic acids having from 2 to 16 carbon atoms. Specific examples of adhesion control additives include, for example, potassium acetate, potassium formate, potassium propanoate, potassium butanoate, potassium pentanoate, potassium hexanoate, potassium 2-ethylbutylate, potassium heptanoate, potassium octanoate, potassium 2-ethylhexanoate, magnesium acetate, magnesium formate, magnesium propanoate, magnesium butanoate, magnesium pentanoate, magnesium hexanoate, magnesium 2-ethylbutylate, magnesium heptanoate, magnesium octanoate, magnesium 2-ethylhexanoate and mixtures thereof. The adhesion control additive is typically used in the range of about 0.001 to about 0.5 weight percent based on the total weight of the polymeric sheet composition.

Poly(ethylene-co-vinyl acetate) resins are also preferred for use in polymeric sheets of this embodiment. Suitable poly(ethylene-co-vinyl acetate) resins have a vinyl acetate level between about 10 to about 50 weight percent, preferably between about 20 to about 40 weight percent, and more preferably between about 25 to about 35 weight percent, based on the total weight of the resin. Some suitable resins may be obtained from the Bridgestone Corporation of Tokyo, Japan; the Exxon Mobil Chemical Corp. of Houston, Tex.; and from E.I. du Pont de Nemours & Co. of Wilmington, Del.

The poly(ethylene-co-vinyl acetate) resins may incorporate one or more other unsaturated comonomers. Preferably, the other unsaturated comonomers are selected from the group consisting of methyl acrylate, methyl methacrylate, butyl acrylate, butyl methacrylate, glycidyl methacrylate, acrylic acid, methacrylic acid and mixtures thereof. The ethylene copolymers of the present invention may incorporate a finite amount up to about 50 weight percent of the other unsaturated comonomer, when present, and preferably no more than about 25 weight percent, based on the total weight of the resin. More preferably, however, the other unsaturated comonomer(s) are not present at a significant level.

Any of the plasticizers described above may be used with the poly(ethylene-co-vinyl acetate) resins. Generally, the plasticizer level within the poly(ethylene-co-vinyl acetate) resin composition does not exceed about 5 weight percent based on the total weight of the plasticized composition.

The poly(ethylene-co-vinyl acetate) resin composition preferably also incorporates one or more additives that reduce a polymers melt flow. Advantageously, polymeric materials including these additives may serve as fire retardant interlayers, because the reduced tendency to melt and flow out of laminates provides less accessible fuel for a fire. Concomitantly, these additives increase the upper limit of temperature at which the compositions of present invention are useful, typically by about 20 to 70° C. Specific examples of melt flow reducing additives include, without limitation, organic peroxides, such as 2,5-dimethylhexane-2,5-dihydroperoxide, 2,5-dimethyl-2,5-di(tert-betylperoxy)hexane-3, di-tert-butyl peroxide, tert-butylcumyl peroxide, 2,5-dimethyl-2,5-di(tert-butylperoxy)hexane, dicumyl peroxide, alpha, alpha'-bis (tert-butyl-peroxyisopropyl)benzene, n-butyl-4,4-bis(tert-butylperoxy)valerate, 2,2-bis(tert-butylperoxy)butane, 1,1-bis(tert-butyl-peroxy)cyclohexane, 1,1-bis(tert-butylperoxy)-3,3,5-trimethyl-cyclohexane, tert-butyl peroxybenzoate, benzoyl peroxide and mixtures combinations thereof. Preferably, the organic peroxide decomposes at a temperature of about 100° C. or higher to generate radicals. More preferably, the organic peroxides have a decomposition temperature that affords a half life of 10 hours at about 70° C. or higher, to provide improved stability for blending operations. The organic peroxide(s) may be present in a finite amount up to about 10 weight percent, based on the total weight of the sheet composition.

One or more initiators, such as dibutyltin dilaurate, may be used in conjunction with the organic peroxides. The initiator(s), when present, are added in a finite amount up to about 0.05 weight percent based on the total weight of the ethylene copolymer composition. One or more inhibitors, such as hydroquinone, hydroquinone monomethyl ether, p-benzoquinone, and methylhydroquinone, may also be added in conjunction with the organic peroxides to enhance reaction control and stability. The inhibitor(s) may be added at a level of less than about 5 weight percent based on the total weight of the ethylene copolymer composition.

Alternatively, the poly(ethylene-co-vinyl acetate) resin may be cured by light. In this instance, the organic peroxide may be replaced with a photoinitiator or photosensitizer.

The poly(ethylene-co-vinyl acetate) resin composition may also incorporate materials that contain acryloyl(oxy) groups, methacryloyl(oxy) groups and/or epoxy groups, for improvement or adjustment of various properties, such as, for example, mechanical strength, adhesion properties, optical characteristics such as transparency, heat resistance, light resistance, and the rate of crosslinking.

The poly(ethylene-co-vinyl acetate) resin compositions may also incorporate a silane coupling agent to enhance the adhesive strengths of the bonds between the sheet and the solar control film, or between the sheet and any additional layer that may be present. Specific examples of preferable silane coupling agents include, for example, gamma-chloropropylmethoxysilane, vinyltriethoxysilane, vinyltris(beta-methoxyethoxy)silane, gamma-methacryloxypropylmethoxysilane, vinyltriacetoxysilane, gamma-glycidoxypropyltrimethoxysilane, gamma-glycidoxypropyltriethoxysilane, beta-(3,4-epoxycyclohexyl) ethyltrimethoxysilane, vinyltrichlorosilane, gamma-mercaptopropyl methoxysilane, gamma-aminopropyltriethoxysilane, N-beta-(aminoethyl)-gamma-aminopropyltrimethoxysilane and mixtures thereof. These silane coupling agent materials are preferably used in a finite amount of about 5 weight percent or less, based on the total weight of the poly (ethylene-co-vinyl acetate) resin composition.

In a second embodiment, the polymeric sheet comprises a material with a modulus of about 20,000 psi (138 MPa) to about 100,000 psi (690 MPa) as measured by ASTM Method D-638. Preferably, in this embodiment, the polymeric sheet comprises an ethylene acid copolymer composition or an ionomer derived from an ethylene acid copolymer composition.

Suitable ethylene acid copolymers have a modulus of about 20,000 psi (138 MPa) to about 100,000 psi (690 MPa). Preferably, the modulus is of about 25,000 psi (173 MPa) to about 100,000 psi (690 MPa), and more preferably, the modulus is of about 30,000 psi (207 MPa) to about 80,000 psi (552 MPa), as measured by ASTM Method D-638. Also, suitable ethylene acid copolymers comprise from about 0.1 weight percent to about 30 weight percent of one or more alpha, beta-ethylenically unsaturated acid comonomers, preferably from about 10 weight percent to about 25 weight percent of the alpha, beta-ethylenically unsaturated acid comonomer(s), and more preferably from about 15 weight percent to about 25 weight percent of the alpha, beta-ethylenically unsaturated acid comonomer(s), based on the total weight of the polymer. Those of skill in the art are aware that the level of alpha, beta-ethylenically unsaturated acid comonomer(s) in an ethylene copolymer affects the copolymers adhesion to glass.

Preferred alpha, beta-ethylenically unsaturated acid comonomer(s) include, without limitation, (meth)acrylic acid, itaconic acid, maleic acid, maleic anhydride, fumaric acid, and monomethyl maleic acid. More preferably, the alpha, beta-ethylenically unsaturated acid comonomer is (meth)acrylic acid.

The acid groups of the ethylene acid copolymers are preferably at least partially neutralized with one or more metal cations. The metal cations may be monovalent, divalent, trivalent, or of even higher valence. Preferred monovalent ions include ions of sodium, potassium, lithium, silver, mercury, and copper. Preferred divalent ions include ions of beryllium, magnesium, calcium, strontium, barium, copper, cadmium, mercury, tin, lead, iron, cobalt, nickel, and zinc. Preferred trivalent ions include ions of aluminum, scandium, iron, and yttrium. Preferred ions of even higher valence include ions of titanium, zirconium, hafnium, vanadium, tantalum, tungsten, chromium, cerium, and iron. Preferably, when the metal cation is tetravalent or of higher valence, complexing agents, such as stearate, oleate, salicylate, and phenolate groups are included, as described in U.S. Pat. No. 3,404,134. Ions of sodium, lithium, magnesium, zinc, aluminum, and combinations of two or more of sodium, lithium, magnesium, zinc, and aluminum are more preferred. Sodium ions, zinc ions, and mixtures of sodium and zinc ions are still more preferred. Generally, sodium ions are associated with high optical clarity, and zinc ions are associated with high moisture resistance. Preferably, from about 0 to about 100 percent, more preferably from about 10 to about 100 percent, and still more preferably from about 20 to about 80 percent of the acid groups in the ethylene copolymers are neutralized.

The ethylene acid copolymers may optionally contain other comonomers. Preferred comonomers include alkyl (meth)acrylates, wherein the alkyl group is a branched or unbranched moiety including up to about 20 carbons. The alkyl groups may be unsubstituted, or substituted with one or more hydroxyl groups. Preferred alkyl groups include methyl, ethyl, propyl, isopropyl, butyl, isobutyl, tert-butyl acrylate, tert-butyl, octyl, undecyl, octadecyl, dodecyl, 2-ethylhexyl, isobornyl, lauryl, 2-hydroxyethyl acrylate, 2-hydroxyethyl. Other preferred comonomers include, without limitation, glycidyl (meth)acrylate, poly(ethylene glycol) (meth)acrylate, poly(ethylene glycol) methyl ether (meth) acrylate, poly(ethylene glycol) behenyl ether (meth)acrylate, poly(ethylene glycol) 4-nonylphenyl ether (meth)acrylate, poly(ethylene glycol) phenyl ether (meth)acrylate, dialkyl maleate (C1 to C4 alkyl), dialkyl fumarate (C1 to C4 alkyl), dimenthyl fumarate, vinyl acetate, vinyl propionate, and the like, and mixtures thereof. More preferred comonomers include, without limitation, methyl (meth)acrylate, butyl (meth)acrylate, glycidyl (meth)acrylate, vinyl acetate, and mixtures of two or more of methyl (meth)acrylate, butyl (meth)acrylate, glycidyl (meth)acrylate, and vinyl acetate.

Provided that the ethylene acid copolymer maintains a modulus of greater than 20,000 psi, the other comonomer(s) may be present in a finite amount up to about 50 weight percent, more preferably up to about 25 weight percent, and still more preferably up to about 10 weight percent, based on the total weight of the ethylene acid copolymer.

Ethylene acid copolymers suitable for use in the present invention may be polymerized and neutralized as described, for example, in U.S. Pat. Nos. 3,404,134; 5,028,674; 6,500,888; and 6,518,365. Recycled ethylene acid copolymers may also be used, together with or in place of virgin materials.

The polymeric sheet can also include one or more plasticizers, which may be added to improve processing, final mechanical properties, or to reduce rattle or rustle of the films and sheets of the present invention. Essentially any plasticizer may find use in the present invention and any of the plasticizers discussed above may be used.

The polymeric sheet can also include silane coupling agents described above and at least one dispersant. The choice of a dispersant and its concentration will depend on many factors, including the surface characteristics of the nanoparticles, the chemical nature of the ethylene copolymer, and the techniques used to mill, suspend, or disperse the nanoparticles. Essentially any dispersant may find utility within the compositions of the present invention. When used, the dispersant is preferably present in a finite amount up to about 10 weight percent, based on the total weight of the nanoparticulate solar control composition.

The polymeric sheet of either of the above embodiments may optionally include other ingredients, such as, for example, processing aides, flow enhancing additives, lubricants, pigments, dyes, flame retardants, impact modifiers, nucleating agents to increase crystallinity, antiblocking agents such as silica, UV stabilizers, thermal stabilizers, adhesives, primers, colorants such as bluing agents, crosslinking agents, hardening agents, pH adjusting agents, antifoaming agents, wetting agents, antioxidants, slip agents, liquid elastomers, and the like. Suitable levels of these additives and methods of incorporating the additives into polymer compositions will be available to those of skill in the art. See, for example, "Modern Plastics Encyclopedia", McGraw-Hill, New York, N.Y. 1995.

The polymeric sheet of either of the above embodiments may incorporate an effective amount of a thermal stabilizer. Essentially any thermal stabilizer is suitable for use in the present invention. Preferred classes of thermal stabilizers include, without limitation, phenolic antioxidants, alkylated monophenols, alkylthiomethylphenols, hydroquinones, alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, aminic antioxidants, aryl amines, diaryl amines, polyaryl amines, acylaminophenols, oxamides, metal deactivators, phosphites, phosphonites, benzylphosphonates, ascorbic acid (vitamin C), compounds which destroy peroxide, hydroxylamines, nitrones, thiosynergists, benzofuranones, indolinone and mixtures thereof. When one or more thermal stabilizers is used, the compositions of the present invention preferably incorporate a finite amount up to about 10.0 weight percent, more preferably up to about 5.0 weight percent, and still more preferably up to about 1.0 weight percent of thermal stabilizer(s), based on the total weight of the composition.

The polymeric sheet of either of the above embodiments may incorporate an effective amount of one or more UV absorbers. Essentially any UV absorber is suitable for use in the present invention. Preferred classes of UV absorbers include, without limitation, benzotriazoles, hydroxybenzophenones, hydroxyphenyl triazines, esters of substituted and unsubstituted benzoic acids and mixtures thereof. When one or more UV absorbers is used, the compositions of the present invention preferably incorporate a finite amount up to about 10.0 weight percent, more preferably up to about 5.0 weight percent, and still more preferably up to about 1.0 weight percent of UV absorber(s), based on the total weight of the composition.

The polymeric sheet of either of the above embodiments may incorporate an effective amount of one or more hindered amine light stabilizers (HALS). Essentially any hindered amine light stabilizer is suitable for use in the present invention. Generally, hindered amine light stabilizers are secondary or tertiary, acetylated, N-hydrocarbyloxy substituted, hydroxy substituted N-hydrocarbyloxy substituted, or other substituted cyclic amines that further incorporate steric hindrance, typically derived from aliphatic substitution on the carbon atoms adjacent to the amine function. When one or more hindered amine light stabilizers are used, the compositions of the present invention preferably incorporate a finite amount up to about 10.0 weight percent, more preferably up to about 5.0 weight percent, and still more preferably, up to about 1.0 weight percent of hindered amine light stabilizer(s), based on the total weight of the composition.

Polymeric sheets of both of the above embodiments may be formed by any process known in the art, such as extrusion, calendering, solution casting or injection molding. Extrusion methods are preferred. The parameters for each of these processes can be easily determined by one of ordinary skill in the art depending upon viscosity characteristics of the polymeric material and the desired thickness of the sheet.

Preferably, the melt processing temperature of the polymeric sheet compositions is from about 50° C. to about 300° C., and more preferably from about 100° C. to about 250° C. The preferred materials have excellent thermal stability, which allows for processing at temperatures high enough to reduce the effective melt viscosity.

The polymeric sheet may have a smooth surface. Preferably, the polymeric sheet has at least one roughened surface to effectively allow most of the air to be removed from between the surfaces of the laminate during the lamination process. Rough surfaces on one or both sides of the extruded sheet may be provided by the design of the die opening and the temperature of the die exit surfaces through which the extrudate passes, such as through melt fracture processes. Roughening may also be accomplished by post-extrusion operations such as mechanically embossing the sheet after extrusion or by melt fracture during extrusion of the sheet.

Many sheet formation methods, and extrusion processes in particular, can also be combined with a variety of post-extruding operations for expanded versatility. Such post-forming operations include altering round to oval shapes, blowing the film to different dimensions, machining, punching, stretching or orienting, rolling, calendering, coating, embossing, printing, and radiation such as E-beam treatment to increase the Vicat softening point. The post extruding operations, together with the polymeric composition, the method of forming the polymer, and the method of forming the sheet, affect many properties, such as clarity, shrinkage, tensile strength, elongation at break, impact strength, dielectric strength and constant, tensile modulus, chemical resistance, melting point, heat deflection temperature and adhesion.

For example, sheets formed by any method may be oriented, uniaxially or biaxially, by stretching in one or both of the machine and transverse directions after formation according to any suitable methods. Preferably, the drawing or stretching is conducted at a temperature of at least 10° C. above the glass transition temperature of the sheet material and more preferably also below the Vicat softening temperature of the sheet material, still more preferably at least 10° C. below the Vicat softening point.

Preferably, the shrinkage of the oriented sheets is controlled by heat stabilization, that is, by holding the sheet in a stretched position and heating for a few seconds before quenching. This stabilizes the oriented sheet, which then may shrink only at temperatures above the heat stabilization temperature. Preferably, the oriented sheets shrink less than 2 percent in both directions after 30 minutes at 150° C.

The polymeric sheets may include multilayer laminates having two or more layers. Optionally, at least one of the layers comprises nanoparticles. The multilayer sheet structures may be formed by any suitable means, such as, for example, coextrusion, blown film, dipcoating, solution coating, blade, puddle, air-knife, printing, Dahlgren, gravure, powder coating, spraying, or other art processes. The individual layers may be joined together by heat, adhesive and/or tie layer, for example.

Also provided by the invention are solar control laminates comprising a polymeric sheet, a solar control film, and at least one additional layer. In certain preferred embodiments, the solar control laminates of the invention consist essentially of a polymeric sheet, a solar control film, and at least one additional layer. The additional layer may be a film or a sheet.

Preferred films for use as additional film layers include, without limitation, oriented and unoriented polyester films, polycarbonate films, polyurethane films, and polyvinyl chloride films. Preferably, the additional film layer is biaxially oriented poly(ethylene terephthalate). Preferred sheets for use as additional sheet layers include, without limitation, sheets comprising polyvinyl butyral compositions, acoustic polyvinyl acetal compositions, acoustic polyvinyl butyral compositions, ethylene vinyl acetate compositions, thermoplastic polyurethane compositions, polyvinyl chloride copolymer compositions, ethylene acid copolymer compositions and ionomers derived therefrom.

Preferred rigid sheets for use as additional layers include glass. The term "glass" as used herein includes window glass, plate glass, silicate glass, sheet glass, float glass, colored glass, specialty glass which may, for example, include ingredients to control solar heating, glass coated with sputtered metals such as silver, glass coated with ATO and/or ITO, E-glass, Solex™ glass (available from PPG Industries of Pittsburgh, Pa.), and Toroglass™. Alternatively, the rigid sheet may be polymeric sheet of a polycarbonate, an acrylic, a polyacrylate, a cyclic polyolefin such as ethylene norbornene, metallocene-catalyzed polystyrene, and mixtures or combinations thereof. Preferably, the rigid sheet is transparent. A metal or ceramic plate may be used as a rigid sheet, however, if transparency or clarity is not required in the solar control laminate.

The additional layer(s) may provide additional attributes, such as acoustical barrier properties. The additional layer(s) may also have functional coatings applied to them, such as organic infrared absorbers and, in applications in which electrical conductivity may not be disadvantageous, sputtered metal layers. Moreover, solar control films suitable for use in the invention may also be used as additional film layers. Those of skill in the art are aware that the treatments, hard coats, adhesives, and primers described above may also be applied to the additional layer(s), as dictated by the desired construction of the solar control laminate and the process efficiencies.

Preferred solar control laminates of the invention include structures comprising adjacent layers as follows:
  polymeric sheet/solar control film;
  rigid sheet/polymeric sheet/solar control film;
  rigid sheet/polymeric sheet/solar control film/polymeric sheet/rigid sheet;
  rigid sheet/polymeric sheet/solar control film/polymeric sheet/film;

rigid sheet/polymeric sheet/film/sheet/solar control film; and rigid sheet/polymeric sheet/solar control film/polymeric sheet/rigid sheet/polymeric sheet/film/polymeric sheet/rigid sheet;

wherein the films and sheets in a structure are selected independently and may be the same as or different from other films or sheets in the structure. In each of the above embodiments and throughout this description, the symbol "/" indicates adjacent layers, which, in alternative embodiments, may be adjoining or contiguous.

Any suitable process may be used to produce the solar control laminates of the present invention. Those of skill in the art are aware that different processes and conditions may be desirable, depending on the composition of the layers in the solar control laminate, and on whether a rigid or flexible laminate is desired.

For example, the polymeric sheet and solar control film may be bonded to each other and/or to one or more additional layers in a nip roll process. In such a process, the additional layer(s) are fed along with the film or sheet of the invention through one or more calendar roll nips in which the two layers are subjected to moderate pressure and, as a result, form a weakly bonded laminate. Generally, the bonding pressure will be within the range of about 10 psi (0.7 kg/cm$^2$) to about 75 psi (5.3 kg/cm$^2$), and preferably it is within the range of about 25 psi (1.8 kg/cm$^2$) to about 30 psi (2.1 kg/cm$^2$). Typical line speeds are within the range of about 5 feet (1.5 m) to about 30 feet (9.2 m) per minute. The nip roll process may be conducted with or without moderate heating, which may be supplied by an oven or by a heated roll, for example. When heated, the polymer surfaces should achieve a temperature sufficient to promote temporary fusion bonding, that is, to cause the surfaces of the polymeric sheet or film to become tacky. Suitable surface temperatures for the preferred polymeric films and sheets of the invention are within the range of about 50° C. to about 120° C., and preferably the surface temperature is about 65° C. After fusion bonding, the laminate may be passed over one or more cooling rolls to ensure that the laminate is sufficiently strong and not tacky when taken up for storage. Process water cooling is generally sufficient to achieve this objective.

In another typical procedure to make a solar control laminate, an interlayer comprising a solar control laminate of the invention, such as an interlayer with a polymeric sheet/solar control film/polymeric sheet structure, is positioned between two glass plates to form a glass/interlayer/glass pre-press assembly. Preferably, the glass plates have been washed and dried. Air is drawn out from between the layers of the pre-press assembly using a vacuum bag (see, for example, U.S. Pat. No. 3,311,517), a vacuum ring, or another apparatus capable of maintaining a vacuum of approximately 27 to 28 inches (689 to 711 mm Hg). The pre-press assembly is sealed under vacuum, then placed into an autoclave for heating under pressure. With increasing order in the preference given, the temperature in the autoclave is from about 130° C. to about 180° C., from about 120° C. to about 160° C., from about 135° C. to about 160° C., or from about 145° C. to about 155° C. The pressure in the autoclave is preferably about 200 psi (15 bar). With increasing order in the preference given, the pre-press assembly is heated in the autoclave for about 10 to about 50 minutes, about 20 to about 45 minutes, about 20 to about 40 minutes, or about 25 to about 35 minutes. Following the heat and pressure cycle, the air in the autoclave is cooled without adding additional gas to maintain pressure in the autoclave. After about 20 minutes of cooling, the excess air pressure is vented and the laminates are removed from the autoclave.

Alternatively, a nip roll process may be used to produce solar control laminates. In one such process, the glass/interlayer/glass assembly is heated in an oven at or to between about 80° C. and about 120° C., preferably between about 90° C. and about 100° C., for about 30 minutes. Thereafter, the heated glass/interlayer/glass assembly is passed through a set of nip rolls so that the air in the void spaces between the glass and the interlayer is expelled. The edges of the structure are sealed at this point to produce a pre-press assembly that may be processed under vacuum in an autoclave, as described above, to produce a solar control laminate.

Solar control laminates may also be produced by non-autoclave processes. Several suitable non-autoclave processes are described in U.S. Pat. Nos. 3,234,062; 3,852,136; 4,341,576; 4,385,951; 4,398,979; 5,536,347; 5,853,516; 6,342,116; 5,415,909; in U.S. Patent Appln. Publn. No. 2004/0182493; in European Patent No. 1 235 683 B1; and in International Patent Appln. Publn. Nos. WO 91/01880 and WO 03/057478 A1. Generally, non-autoclave processes include heating the pre-press assembly and the application of vacuum, pressure or both. For example, the pre-press assembly may be passed through heating ovens and nip rolls.

For architectural uses and for uses in transportation vehicles, a preferred glass laminate has two layers of glass, and, directly laminated to both glass layers, a single interlayer comprising a solar control laminate of the invention. Preferably, the interlayer also comprises a second polymeric sheet, and each polymeric sheet is in contact with one of the glass layers. In these applications, the glass laminate preferably has an overall thickness of about 3 mm to about 30 mm. The interlayer typically has a thickness of about 0.38 mm to about 4.6 mm, and each glass layer usually is at least 1 mm thick or thicker. Also preferred are multilayered solar control laminates, such as a five layer laminate of glass/interlayer/glass/interlayer/glass and a seven layer laminate of glass/interlayer/glass/interlayer/glass/interlayer/glass.

EXAMPLES AND COMPARATIVE EXAMPLES

The examples are presented for illustrative purposes only, and are not intended to limit the scope of the invention in any manner.

Analytical Methods

Compressive shear strength was measured according to the method described in U.S. Pat. No. 6,599,630. Briefly, six 1" by 1" (25 mm by 25 mm) chips are sawed from the laminate to be tested. The chips are conditioned in a room controlled at 23±2° C. and 50±1% relative humidity for one hour prior to testing. The chip was placed on the cut-out on the lower half of the jig shown in FIG. 1 of U.S. Pat. No. 6,599,630, and the upper half of the jig was placed on top of the chip. A cross-head was lowered at the rate of 0.1 inch per minute (2.5 mm per minute) until it contacted the upper piece of the device. As the cross-head continues to travel downward, one rigid layer of the chip begins to slide relative to the other. The compressive shear strength of the chip was the shear stress required to cause adhesive failure between the layers of the laminate. The precision of this test is such that one standard deviation is typically 6 percent of the average result of six chips.

The pummel adhesion rating was determined by cooling a portion of the laminate, typically about 15 cm by 30 cm, for 8 hours at −18° C. A force is evenly applied over a 10 by 15 cm area of the cooled sample by blows from a 450-g flathead hammer at a predetermined velocity until the glass is pulverized. The pummel adhesion rating is assigned based on the amount of pulverized glass remaining adhered to the substrate according to the arbitrary scale set forth in Table 1.

TABLE 1

Pummel Adhesion Rating Scale

| Percentage of Glass Removed from Surface | Pummel Adhesion Rating |
|---|---|
| 100 | 0 |
| 95 | 1 |
| 90 | 2 |
| 85 | 3 |
| 60 | 4 |
| 40 | 5 |
| 20 | 6 |
| 10 | 7 |
| 5 | 8 |
| 2 | 9 |
| 0 | 10 |

The pummel test is performed on both surfaces of the laminate. In general, good impact performance occurs when at least 60% of the glass adheres to the interlayer after pummeling. This corresponds to a pummel adhesion rating of 5 or greater for each surface, a result that is denoted as "5/5".

Haze is the percentage of luminous flux that is scattered at an angle of more than 2.5 degrees from the axis defined by the path of unscattered light traveling through the laminate. Haze was measured using a Hazegard hazemeter, available from BYK-Gardner USA of Columbia, Md., according to ASTM standard NF-54-111, which is in agreement with method A of ASTM standard D1003-61.

Solar control properties were measured according to ASTM test methods E424 and E308 and ISO test methods 9050:2003 and 13837. Specific sources for the test conditions are set forth in Table 2, below. Measurements were make using a Perkin Elmer Lambda 19 Spectrophotometer (PerkinElmer, Inc., Wellesley, Mass.).

TABLE 2

Test Conditions

| Measurement | Source for Test Condition |
|---|---|
| Solar Transmission I | ASTM E424 TSET/R |
| Visible Transmission | ASTM E308, D65 10 degrees |
| D65 | ISO9050: 2003, Table 1 |
| Solar Transmission II | ISO9050: 2003, Table 2 |
| UV Transmission | ISO9050: 2003, Table 3 |
| Damage | ISO9050: 2003, Table 4 |
| Skin Damage | ISO9050: 2003, Table 5 |
| UV Transmission (400 nm) | ISO 13837 |

Standard Lamination Procedure

A pre-press assembly, in which all the layers in the laminate are cut to the same size and stacked in the desired order, is placed into a vacuum bag and heated at 90 to 100° C. for 30 minutes to remove any air contained between the layers of the pre-press assembly. The pre-press assembly is heated at 135° C. for 30 minutes in an air autoclave at a pressure of 200 psig (14.3 bar). The air is then cooled without adding additional gas, so that the pressure in the autoclave is allowed to decrease. After 20 minutes of cooling, when the air temperature is less than about 50° C., the excess pressure is vented, and the laminate is removed from the autoclave.

Comparative Example CE 1

Two Butacite® poly(vinyl butyral) polymer sheets (E. I. du Pont de Nemours and Company, 1007 Market Street, Wilmington, Del., USA, 19898) were conditioned overnight at 23% relative humidity and a temperature of 72.1° F. A glass/interlayer/interlayer/glass pre-press assembly consisting of, in order, a clear annealed float glass plate layer, the first conditioned Butacite® sheet layer, the second conditioned Butacite® sheet layer, and a second clear annealed float glass plate layer (each layer measuring 6 inches by 12 inches; glass layers 2.5 mm thick; Butacite® sheets 15 mils thick) was laminated according to the standard procedure. The compressive shear strength, pummel adhesion, haze, solar transmission and visible light transmission of the laminate were measured and are shown in Table 3.

Examples 1 to 4

For each of Examples 1 to 4, two Butacite® interlayer sheets and a solar control film were conditioned overnight at 23% relative humidity a temperature of 72.1° F. The solar control films were Raybarrier™ films available from the Sumitomo Osaka Cement Company, Ltd., of Chiba, Japan. The specific grade of Raybarrier™ film used in each Example is identified in Table 3. A glass/interlayer/film/interlayer/glass pre-press assembly consisting of, in order, a clear annealed float glass plate layer, a first conditioned Butacite® sheet layer, a solar control film, a second conditioned Butacite® sheet layer, and a second clear annealed float glass plate layer (each layer measuring 6 inches by 12 inches; glass layers 2.5 mm thick; Butacite® sheets 15 mils thick) was laminated according to the standard procedure. Example 3 is a repetition of Example 1. The compressive shear strength, pummel adhesion, haze, solar transmission and visible light transmission were measured for CE1 and Examples 14. The transmission of light from a standard Illuminant A source was measured for Examples 3 and 4. The results of all these measurements are shown in Table 3.

TABLE 3

| | Example No. | | | | |
|---|---|---|---|---|---|
| | CE 1 | 1 | 2 | 3 | 4 |
| Solar Control Layer | None | TFI-5063N | TFI-5080N | TFI-5063N | TFI-3880N |
| Compressive Shear Strength, psi | 4667 | 2602 | 8888 | 3076 | 694 |
| Pummel Adhesion Rating | 8.0/8.0 | 8.0/8.0 | 8.0/8.0 | 8.0/8.0 | 8.0/8.0 |
| Haze, % | 0.38 | 0.70 | 1.2 | 0.99 | 0.77 |
| Solar Transmission, % | 74.6 | 40.8 | 59.5 | 40.6 | 60.5 |
| Visible Transmission, % | 87.8 | 63.9 | 78.7 | 63.7 | 80.0 |
| Illuminate A, % | n.m. | n.m. | n.m. | 65.8 | 82.5 |

Example 5

Two Butacite® BE-1030 sheets and a Raybarrier™ TFI-3880N film were conditioned overnight at 23% relative humidity and a temperature of 72° F. A pre-press assembly consisting of, in order, an annealed float glass sheet layer, a thin Teflon® film layer, a Butacite® sheet layer, the Raybarrier™ TFI-3880N film layer with its coated side in contact with the Butacite® sheet, a thin Teflon® film layer, and an annealed float glass layer (each layer measuring 6 inches by 12 inches; glass layers 2.5 mm thick; Butacite® sheets 15 mils thick) was laminated according to the standard method. The glass sheet/Teflon® film/Butacite® interlayer/Raybarrier™ film/Teflon® film/glass sheet laminate was removed from the autoclave, cooled to room temperature, and separated along the Teflon® layers to yield a solar control laminate of a Butacite sheet and a Raybarrier™ film. The procedure was then repeated.

The peel strength adhesion of the two Butacite® sheet/Raybarrier™ film laminates was measured using an Imass SP-102B-3M90 slip/peel tester, available from Instrumentors, Inc., of Strongsville, Ohio. The laminates were peeled at rates of 1 inch and 2 inches per minute, at an angle of 90°. The adhesive strength between the layers of the laminates was found to be very high.

Example 6

The fabrication and measurements of Example 5 were repeated, except that the uncoated side of the Raybarrier™ TFI-3880N film was in contact with the Butacite® sheet. The resulting laminates were found to have poor adhesion.

Example 7

Two Butacite® BE-1030 sheets and a Raybarrier™ TFI-5063N film were conditioned overnight at 23% relative humidity and a temperature of 72° F. A pre-press assembly consisting of, in order, an annealed float glass sheet layer, a thin Teflon® film layer, a Butacite® sheet layer, the Raybarrier™ TFI-5063N film layer with its coated side in contact with the Butacite® sheet, a thin Teflon® film layer, and a second annealed float glass layer was laminated according to the standard method. The glass sheet/Teflon® film/Butacite® interlayer/Raybarrier™ film/Teflon® film/glass sheet laminate was removed from the autoclave, cooled to room temperature, and separated along the Teflon® layers to yield a solar control laminate including a Butacite® sheet and a Raybarrier™ film. The procedure was then repeated.

The peel strength adhesion of the two Butacite® sheet/Raybarrier™ film laminates was measured using an Imass SP-102B-3M90 slip/peel tester. The laminates were peeled at rates of 1 inch and 2 inches per minute, at an angle of 90°. The laminates were found to have 8.1 lb/inch adhesion at the 1 inch per minute rate and 8.7 lb/inch adhesion at the 2 inch per minute rate.

Example 8

The fabrication and measurements of Example 7 were repeated, except that the uncoated side of the Raybarrier™ TFI-5063N film was in contact with the Butacite® sheet. The laminates were found to have 1.8 lb/inch adhesion at the 1 inch per minute rate and 1.4 lb/inch adhesion at the 2 inch per minute rate.

Comparative Example CE 2

Two Butacite® sheets were conditioned overnight at 23% relative humidity and a temperature of 72.1° F. A glass/interlayer/interlayer/glass pre-press assembly consisting of, in order, a clear annealed float glass plate layer, the first conditioned Butacite® sheet layer, the second conditioned Butacite® sheet layer, and a second clear annealed float glass plate layer (each layer measuring 4 inches by 12 inches; glass layers 2.5 mm thick; Butacite® sheets 15 mils thick) was laminated according to the standard procedure. The compressive shear strength, pummel adhesion, haze, solar transmission and visible light transmission of the laminate were measured and are shown in Table 4.

Example 9

Two Butacite® sheets and a Soft Look™ UV/IR 25 solar control film, available from the Tomoegawa Paper Company, Ltd., of Tokyo, Japan, were conditioned overnight at 23% relative humidity a temperature of 72.1° F. A glass/interlayer/film/interlayer/glass pre-press assembly consisting of, in order, a clear annealed float glass plate layer, a first conditioned Butacite® sheet layer, a solar control film, a second conditioned Butacite® sheet layer, and a second clear annealed float glass plate layer (each layer measuring 4 inches by 12 inches; glass layers 2.5 mm thick; Butacite® sheets 15 mils thick) was laminated according to the standard procedure. The compressive shear strength, pummel adhesion, haze, solar transmission, and visible light transmission of this laminate are also shown in Table 4.

TABLE 4

| Example No. | Compressive Shear Strength, psi | Pummel Adhesion Rating | Haze, % | Solar Transmission, % | Visible Transmission, % |
| --- | --- | --- | --- | --- | --- |
| CE 2 | 5083 | 8.0/8.0 | 0.29 | 74.5 | 87.7 |
| 9 | 4667 | 5.5/6.0 | 3.25 | 60.3 | 80.3 |

Comparative Example CE 3

Two Butacite® BE-1030 sheets and an uncoated biaxially oriented poly(ethylene terephthalate) film were conditioned overnight at 23% relative humidity a temperature of 72° F. A pre-press assembly consisting of, in order, a clear annealed float glass plate layer, a conditioned Butacite® sheet layer, an uncoated poly(ethylene terephthalate) film, a Teflon® film, a second conditioned Butacite® sheet layer, and a second clear annealed float glass plate layer (each layer measuring 6 inches by 12 inches; glass layers 2.5 mm thick; Butacite® sheets 30 mils thick) was laminated according to the standard procedure. Removal of the Teflon® film and the second glass layer provides a glass sheet/interlayer/polyester film laminate. The solar transmission, visible light transmission and light transmission from an Illuminant A source were measured for this laminate and are shown in Table 5.

Examples 10 and 11

The fabrication and measurements of Comparative Example CE 2 were repeated, except that a Soft Look™ UV/IR 25 solar control film was substituted for the uncoated poly(ethylene terephthalate) film. In Example 10, the coated side of the Soft Look™ film was in contact with the Butacite® sheet, and in Example 11 the uncoated side of the Soft Look™ film was in contact with the Butacite® sheet. The solar transmission, visible light transmission and light transmission from an Illuminant A source were measured for these laminates and are shown in Table 5.

Comparative Example CE 4

An uncoated biaxially oriented poly(ethylene terephthalate) film was primed by dipcoating in a solution of 0.05 wt % Silane A-1110™ (Dow Corning Company, Midland, Mich.) in isopropanol and then dried. Two Butacite® BE-1030 sheets and the primed, uncoated poly(ethylene terephthalate) film were conditioned overnight at 23% relative humidity a temperature of 72° F. A pre-press assembly consisting of, in order, a clear annealed float glass plate layer, a conditioned Butacite® polymer sheet layer, the primed uncoated poly (ethylene terephthalate) film, a Teflon® film, a second conditioned Butacite® sheet layer, and a second clear annealed float glass plate layer (each layer measuring 6 inches by 12 inches; glass layers 2.5 mm thick; Butacite® sheets 30 mils thick) was laminated according to the standard procedure. Removal of the Teflon® film and the second glass layer provides a glass sheet/polymer sheet/polyester film laminate. The solar transmission, visible light transmission and light transmission from an Illuminant A source were measured for this laminate and are shown in Table 5.

Examples 12 and 13

The fabrication and measurements of Comparative Example CE 4 were repeated, except that a Soft Look™ UV/IR 25 solar control film, primed on the coated side by dipcoating in a 0.05 wt % solution of Silane A-1110™ in isopropanol was substituted for the primed, uncoated poly (ethylene terephthalate) film. In Example 12, the coated side of the Soft Look™ film was in contact with the Butacite® sheet, and in Example 13 the uncoated side of the Soft Look™ film was in contact with the Butacite® sheet. The solar transmission, visible light transmission and light transmission from an Illuminant A source were measured for these laminates and are shown in Table 5.

TABLE 5

| Example No. | Solar Transmission, % | Visible Transmission, % | Illuminant A Transmission, % |
| --- | --- | --- | --- |
| CE 3 | 71.83 | 80.91 | 81.37 |
| 10 | 63.07 | 78.59 | 79.05 |
| 11 | 65.88 | 81.84 | 82.31 |
| CE 4 | 73.67 | 83.15 | 83.01 |
| 12 | 63.63 | 80.22 | 80.68 |
| 13 | 65.48 | 81.83 | 82.27 |

Comparative Example CE 5

Two Butacite® sheets were conditioned overnight at 23% relative humidity and a temperature of 72° F. A glass/interlayer/interlayer/glass pre-press assembly consisting of, in order, a clear annealed float glass plate layer, the first conditioned Butacite® sheet layer, the second conditioned Butacite® sheet layer, and a second clear annealed float glass plate layer (each layer measuring 6 inches by 12 inches; glass layers 2.5 mm thick; Butacite® sheets 15 mils thick) was laminated according to the standard procedure. The solar control properties of the laminate are shown in Table 6.

Example 14

Two Butacite® sheets and a solar control film, available were conditioned overnight at 23% relative humidity a temperature of 72.1° F. The solar control film was a "KH" film available from the Sumitomo Metal Mining Company of Tokyo, Japan. A glass/interlayer/film/interlayer/glass pre-press assembly consisting of, in order, a clear annealed float glass plate layer, a first conditioned Butacite® sheet layer, a solar control film, a second conditioned Butacite® sheet layer, and a second clear annealed float glass plate layer (each layer measuring 6 inches by 12 inches; glass layers 2.5 mm thick; Butacite® sheets 15 mils thick) was laminated according to the standard procedure. The solar control properties of the laminate are shown in Table 6.

Comparative Example CE 6

Two Butacite® BE-1030 sheets and an uncoated biaxially oriented poly(ethylene terephthalate) film were conditioned overnight at 23% relative humidity a temperature of 72° F. A pre-press assembly consisting of, in order, a clear annealed float glass plate layer, a conditioned Butacite® sheet layer, an uncoated poly(ethylene terephthalate) film, a Teflon® film, a second conditioned Butacite® sheet layer, and a second clear annealed float glass plate layer (each layer measuring 6 inches by 12 inches; glass layers 2.5 mm thick; Butacite® sheets 30 mils thick) was laminated according to the standard procedure. Removal of the Teflon® film and the second glass layer provides a glass sheet/interlayer/polyester film laminate. The solar control properties of this laminate are shown in Table 6.

Example 15

Two Butacite® BE-1030 sheets and a "KH" solar control film were conditioned overnight at 23% relative humidity a temperature of 72° F. A pre-press assembly consisting of, in order, a clear annealed float glass plate layer, a conditioned Butacite® sheet layer, a "KH" film, a Teflon® film, a second conditioned Butacite® sheet layer, and a second clear annealed float glass plate layer (each layer measuring 6 inches by 12 inches; glass layers 2.5 mm thick; Butacite® sheets 30 mils thick) was laminated according to the standard procedure. Removal of the Teflon® film and the second glass layer provides a glass sheet/interlayer/"KH" film laminate. The solar control properties of this laminate are shown in Table 6.

TABLE 6

| | Example No. | | | |
| --- | --- | --- | --- | --- |
| | CE 5 | 14 | CE 6 | 15 |
| Solar Transmission I | 76.19 | 61.03 | 75.82 | 60.99 |
| Visible Transmission | 88.53 | 77.60 | 88.41 | 77.82 |
| D65 | 88.56 | 77.98 | 88.45 | 78.22 |
| Solar Transmission II | 73.70 | 59.34 | 73.42 | 59.33 |
| UV Transmission | 0.03 | 0.00 | 0.01 | 0.00 |
| Damage | 51.47 | 39.56 | 50.42 | 39.41 |
| Skin damage | 0.47 | 0.12 | 0.32 | 0.09 |
| UV Transmission (400 nm) | 5.60 | 1.57 | 3.93 | 1.21 |

Comparative Example CE 7

A glass/interlayer/interlayer/glass pre-press assembly including, in order, a clear annealed float glass plate layer, a first SentryGlas® Plus ethylene/methacrylic acid copolymer sheet layer (E. I. du Pont de Nemours and Company, 1007 Market Street, Wilmington, Del., USA, 19898), a second SentryGlas® Plus ethylene/methacrylic acid copolymer sheet layer, and a second clear annealed float glass plate layer (each layer measuring 6 inches by 12 inches; glass layers 2.5 mm thick; SentryGlas® Plus sheets 15 mils thick) was laminated according to the standard procedure. The haze value and solar control properties of the laminate were measured and are reported in the Table, below.

Example 16

Two SentryGlas® Plus sheets and a Raybarrier® TFI-5063N solar control film were conditioned overnight at 23 percent relative humidity (% RH) and 72.1° F. A glass/interlayer/solar control film/interlayer/glass pre-press assembly consisting of, in order, a clear annealed float glass plate layer, the first conditioned SentryGlas® Plus sheet layer, the conditioned solar control film, the second conditioned SentryGlas® Plus sheet layer, and a second clear annealed float glass plate layer (each layer measuring 6 inches by 12 inches; glass layers 2.5 mm thick; SentryGlas® Plus sheets 15 mils thick). The pre-press assembly was laminated according to the standard procedure. The haze value and solar control properties of the laminate were measured and are shown in Table 7.

Example 17

The procedure of Example 16 was repeated, except that the solar control film was a Raybarrier® TFI-3880N film. The haze value and solar control properties of the resulting laminate were measured and shown in Table 7.

Comparative Example CE 8

The procedure of Comparative Example CE 7 was repeated, except that the dimensions of each layer of the laminate were 4 inches by 12 inches. The haze value and solar control properties of the resulting laminate were measured and are shown in Table 7.

Example 18

A Soft Look® UV/IR 25 solar control film was conditioned overnight at 23% RH and 72° F. A glass/interlayer/film/interlayer/glass pre-press assembly consisting of, in order, a clear annealed float glass plate layer, a first Sentryglas® Plus sheet layer, a solar control film, a second Sentryglas® Plus sheet layer, and a second clear annealed float glass plate layer (each layer measuring 4 inches by 12 inches; glass layers 2.5 mm thick; SentryGlas® Plus sheets 15 mils thick) was laminated according to the standard procedure. The haze value and solar control properties of the laminate were measured and are shown in Table 7.

Comparative Example CE 9

A SentryGlas® Plus polymeric sheet and an uncoated, biaxially oriented poly(ethylene terephthalate) film were conditioned overnight at 23% RH and 72° F. A pre-press assembly consisting of, in order, an annealed float glass sheet layer, a SentryGlas® Plus sheet layer, the uncoated poly(ethylene terephthalate) film layer, a thin Teflon® film layer, and a second annealed float glass layer (each layer measuring 6 inches by 12 inches; glass layers 2.5 mm thick; SentryGlas® Plus sheets 90 mils thick) was laminated according to the standard method. The glass sheet/SentryGlas® Plus interlayer/poly(ethylene terephthalate) film/Teflon® film/glass sheet laminate was removed from the autoclave, cooled to room temperature, and separated along the Teflon® layer to yield a solar control laminate including a glass sheet, a SentryGlas® Plus sheet and a poly(ethylene terephthalate) film. The solar control properties of this laminate were measured and are shown in Table 7.

Example 19

A SentryGlas® Plus polymeric sheet and a Soft Look® UV/IR 25 solar control film were conditioned overnight at 23% RH and 72° F. A pre-press assembly consisting of, in order, an annealed float glass sheet layer, a SentryGlas® Plus sheet layer, the Soft Look® UV/IR 25 film with its coated side in contact with the SentryGlas® Plus sheet, a thin Teflon® film layer, and a second annealed float glass layer (each layer measuring 6 inches by 12 inches; glass layers 2.5 mm thick; SentryGlas® Plus sheets 90 mils thick) was laminated according to the standard method. The glass sheet/SentryGlas® Plus interlayer/solar control film/Teflon® film/glass sheet laminate was removed from the autoclave, cooled to room temperature, and separated along the Teflon® layer to yield a solar control laminate including a glass sheet, a SentryGlas® Plus sheet and a solar control film. The solar control properties of this laminate were measured and are shown in Table 7.

Example 20

The procedure of Example 4 was followed, except that the uncoated side of the Soft Look® UV/IR 25 solar control film was in contact with the SentryGlas® Plus sheet layer. The solar control properties of the resulting laminate were measured and are shown in Table 7.

Comparative Example CE 10

An uncoated, biaxially oriented poly(ethylene terephthalate) film was primed, by dipcoating in a 0.05 wt % solution of Silane A-1110™ in isopropanol, and then dried. A SentryGlas® Plus polymeric sheet and the primed poly(ethylene terephthalate) film were conditioned overnight at 23% RH and 72° F. A pre-press assembly consisting of, in order, an annealed float glass sheet layer, the SentryGlas® Plus sheet layer, the primed poly(ethylene terephthalate) film, a thin Teflon® film layer, and a second annealed float glass layer (each layer measuring 6 inches by 12 inches; glass layers 2.5 mm thick; SentryGlas® Plus sheets 90 mils thick) was laminated according to the standard method. The glass sheet/SentryGlas® Plus interlayer/primed poly(ethylene terephthalate film/Teflon® film/glass sheet laminate was removed from the autoclave, cooled to room temperature, and separated along the Teflon® layer to yield a laminate including a glass sheet, a SentryGlas® Plus sheet and a poly(ethylene terephthalate) film. The solar control properties of this laminate were measured and are shown in Table 7.

Example 21

A Soft Look™ UV/IR 25 film was primed, by dipcoating the coated side of the film in a 0.05 wt % solution of Silane A-1110™ in isopropanol, and then dried. A SentryGlas® Plus polymeric sheet and the primed Soft Look™ film were conditioned overnight at 23% RH and 72° F. A pre-press assembly consisting of, in order, an annealed float glass sheet layer, the SentryGlas® Plus sheet layer, the primed Soft Look™ film with its coated side in contact with the SentryGlas® plus sheet, a thin Teflon® film layer, and a second annealed float glass layer (each layer measuring 6 inches by 12 inches; glass layers 2.5 mm thick; SentryGlas® Plus sheets 90 mils thick) was laminated according to the standard method. The glass sheet/SentryGlas® Plus interlayer/primed Soft Look™ film/Teflon® film/glass sheet laminate was removed from the autoclave, cooled to room temperature, and separated along the Teflon® layer to yield a laminate including a glass sheet, a SentryGlas® Plus sheet and a Soft Look™ solar control film. The solar control properties of this laminate were measured and are shown in Table 7.

Example 22

The procedures of Example 21 were repeated, except that the Soft Look™ film was primed on its uncoated side. The solar control properties of the resulting laminate were measured and are shown in Table 7.

TABLE 7

| Example No. | Haze | Solar Transmission, % | Visible Transmission, % | Illuminant A Transmission, % |
|---|---|---|---|---|
| CE 7 | 1.01 | 75.07 | 87.1 | 90.3 |
| 16 | 1.52 | 39.7 | 61.5 | 64.1 |
| 17 | 1.00 | 60.2 | 78.5 | 81.8 |
| CE 8 | 0.68 | 75.7 | 87.2 | n.m. |
| 18 | 3.44 | 60.5 | 80.1 | n.m. |
| CE 9 | n.m. | 66.43 | 73.09 | 73.54 |
| 19 | n.m. | 63.79 | 79.30 | 80.04 |
| 20 | n.m. | 61.78 | 74.67 | 75.02 |
| CE 10 | n.m. | 70.44 | 77.84 | 77.86 |
| 21 | n.m. | 63.55 | 78.05 | 78.63 |
| 22 | n.m. | 64.51 | 81.37 | 81.73 |

Comparative Example CE 11

Two SentryGlas® Plus sheets were conditioned overnight at a temperature of 72° F. and 23 percent relative humidity (% RH). A glass/interlayer/interlayer/glass pre-press assembly consisting of, in order, a clear annealed float glass plate layer, a first Sentryglas® Plus sheet layer, a second Sentryglas® Plus sheet layer, and a second clear annealed float glass plate layer (each layer measuring 6 inches by 12 inches; glass layers 2.5 mm thick; SentryGlas® Plus ionoplast sheets 15 mils thick) was laminated according to the standard procedure. The solar control properties of the laminate are shown in Table 8.

Example 23

Two SentryGlas® Plus sheets and a "KH" solar control film were conditioned overnight at 72° F. and 23% RH. A glass/interlayer/film/interlayer/glass pre-press assembly consisting of, in order, a clear annealed float glass plate layer, the first conditioned SentryGlas® Plus sheet layer, the solar control film, the second conditioned SentryGlas® Plus sheet layer, and a second clear annealed float glass plate layer (each layer measuring 6 inches by 12 inches; glass layers 2.5 mm thick; SentryGlas® Plus sheets 15 mils thick) was laminated according to the standard procedure. The solar control properties of the laminate are shown in Table 8.

Comparative Example CE 12

A SentryGlas® Plus sheet and an uncoated biaxially oriented poly(ethylene terephthalate) film were conditioned overnight at 72° F. and 23% RH. A pre-press assembly consisting of, in order, a clear annealed float glass plate layer, the conditioned SentryGlas® Plus sheet layer, the conditioned uncoated poly(ethylene terephthalate) film, a Teflon® film, and a second clear annealed float glass plate layer (each layer measuring 6 inches by 12 inches; glass layers 2.5 mm thick; SentryGlas® Plus sheet 30 mils thick) was laminated according to the standard procedure. Removal of the Teflon® film and the second glass layer provided a glass sheet/SentryGlas® Plus interlayer/polyester film laminate. The solar control properties of this laminate are shown in Table 8.

Example 24

A SentryGlas® Plus sheet and a "KH" solar control film were conditioned overnight at 72° F. and 23% RH. A pre-press assembly consisting of, in order, a clear annealed float glass plate layer, the conditioned SentryGlas® Plus sheet layer, the conditioned "KH" film, a Teflon® film, and a second clear annealed float glass plate layer (each layer measuring 6 inches by 12 inches; glass layers 2.5 mm thick; SentryGlas® Plus sheet 30 mils thick) was laminated according to the standard procedure. Removal of the Teflon® film and the second glass layer provides a glass sheet/SentryGlas® Plus interlayer/"KH" film laminate. The solar control properties of this laminate are shown in Table 8.

TABLE 8

| | Example No. | | | |
|---|---|---|---|---|
| | CE 11 | 23 | CE 12 | 24 |
| Solar Transmission I | 76.72 | 62.78 | 78.74 | 62.07 |
| Visible Transmission | 88.27 | 78.39 | 88.50 | 78.01 |
| D65 | 88.27 | 78.69 | 88.50 | 78.39 |
| Solar Transmission II | 74.04 | 60.75 | 77.25 | 60.17 |
| UV Transmission | 2.39 | 0.03 | 59.40 | 0.17 |
| Damage | 57.51 | 42.14 | 76.79 | 41.72 |
| Skin Damage | 2.13 | 0.33 | 15.87 | 0.44 |
| UV Transmission (400 nm) | 20.22 | 3.89 | 67.83 | 4.90 |

While certain of the preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. A solar control laminate consisting of:
   (a) a solar control film comprising a polymeric film, wherein the polymeric film is at least partially coated with a coating comprising inorganic infrared absorbing nanoparticles and a matrix material that serves to bind the nanoparticles to the polymeric film; and further wherein the polymeric film has a thickness of about 0.1 mils (0.003 mm) to about 10 mils (0.25 mm) and comprises a material selected from the group consisting of poly(ethylene terephthalate), polycarbonate, polypropylene, polyethylene, polypropylene, cyclic polyloefins, norbornene polymers, polystyrene, syndiotactic polystyrene, styrene-acrylate copolymers, acrylonitrile-styrene copolymers, poly(ethylene naphthalate), polyethersulfone, polysulfone, nylons, poly(urethanes), acrylics, cellulose acetates, cellulose triacetates, vinyl chloride polymers, polyvinyl fluoride, and polyvinylidene fluoride;

(b) a polymeric sheet, wherein the polymeric sheet has a thickness of about 10 mils (0.25 mm) or greater, and wherein the polymeric sheet consists of one or more polymers and, optionally, one or more additives; said polymer(s) being selected from the group consisting of poly(ethylene-co-vinyl acetate), metallocene-catalyzed polyethylene, ISD resins, polyurethanes, poly(vinyl butyral), acoustic modified poly(vinyl butyral), an ethylene acid copolymer composition and an ionomer derived from an ethylene acid copolymer composition; and said additive(s) being selected from the group consisting of plasticizers, silane coupling agents, processing aides, flow enhancing additives, lubricants, flame retardants, impact modifiers, nucleating agents, antiblocking agents, UV stabilizers, thermal stabilizers, adhesives, primers, crosslinking agents, hardening agents, pH adjusting agents, antifoaming agents, wetting agents, antioxidants, slip agents, liquid elastomers, UV absorbers, and hindered amine light stabilizers;

(c) a rigid sheet comprising or produced from glass, window glass, plate glass, silicate glass, sheet glass, float glass, colored glass, specialty glass, glass coated with one or more sputtered metals, glass coated with ATO and/or ITO, E-glass, polycarbonate, acrylics, polyacrylate, cyclic polyolefins, a metal plate, or a ceramic plate;

(d) a UV-curable hard coat layer; and (e) optionally, at least one additional layer; said optional additional layer(s) selected from the group consisting of oriented and unoriented polyester films, polycarbonate films, polyurethane films, polyvinyl chloride films, additional solar control films, and sheets comprising polyvinyl butyral compositions, ethylene vinyl acetate compositions, thermoplastic polyurethane compositions, polyvinyl chloride copolymer compositions, ethylene acid copolymer or ionomer compositions;

wherein the solar control laminate has the structure "the rigid sheet/ the optional additional layer(s)/ the polymeric sheet/ the solar control film/the UV-curable hard coat layer"; wherein the symbol "/" indicates adjoining layers; and further wherein the UV-curable hard coat layer is the outermost layer of the solar control laminate; and the solar control laminate has one or more attributes of safety glass, including a pummel adhesion rating of 5 or greater or a compressive shear strength of at least about 700 psi.

2. The solar control laminate of claim 1, wherein one or both surfaces of the polymeric film is treated to enhance adhesion with a treatment selected from the group consisting of adhesives, primers, flame treatments, plasma treatments, electron beam treatments, oxidation treatments, corona discharge treatments, chemical treatments, chromic acid treatments, hot air treatments, ozone treatments, ultraviolet light treatments, sand blast treatments, solvent treatments, and combinations thereof.

3. The solar control laminate of claim 1, wherein the inorganic infrared absorbing nanoparticles comprise nanoparticles of antimony tin oxide (ATO), indium tin oxide (ITO), lanthanum hexaboride ($LaB_6$) or mixtures of two or more thereof.

4. The solar control laminate of claim 1, wherein the amount of inorganic infrared absorbing nanoparticles in the coating is from about 0.1 to about 20 weight percent and the amount of matrix material in the coating is from about 20 to about 99.99 weight percent, based on the total weight of the coating.

5. The solar control laminate of claim 1, wherein the matrix material comprises one or more film-forming materials selected from the group consisting of acrylic resins, acrylate resins, urethane resins, urea resins, epoxy resins, phenoxy resins, chlorinated polyether resins, fluorine-containing resins, polyvinyl acetals, polyvinyl formals, silicone resins, ABS resins, poly(vinyl butyral) resins, poly-4-methylpentene, polytrifluoroethylene, polyvinylidene fluoride, olefin polymers and copolymers, poly(ethylene-co-n-butyl acrylate-co-glycidyl acrylate), poly(ethylene-co-methyl acrylate), poly (ethylene-co-ethyl acrylate), poly(ethylene-co-butyl acrylate), poly(ethylene-co-(meth)acrylic acid), metal salts of poly(ethylene-co-(meth)acrylic acid), poly((meth)acrylates), poly(vinyl acetate), poly(ethylene-co-vinyl acetate), poly(vinyl alcohol), poly(ethylene-co-vinyl alcohol), poly (cyclic olefins), polyesters, poly(ethylene terephthalate), poly(1,3-propyl terephthalate), poly(ethylene-co-1,4-cyclohexanedimethanol terephthalate), poly(vinyl chloride) compositions, poly(vinylidene chloride), polystyrene, polyamides, polycarbonates, poly(bisphenol A carbonate), polysulfides, poly(phenylene sulfide), polyethers, poly(2,6-dimethylphenylene oxide), polysulfone resins, starch, starch derivatives, modified starch, thermoplastic starch, cellulose, cellulose derivatives, modified cellulose, cellulose esters, cellulose mixed esters, cellulose ethers, and copolymers of two or more of the materials.

6. The solar control laminate of claim 1, wherein the polymeric sheet comprises a material with a modulus of about 20,000 psi (138 MPa) or less as measured by ASTM Method D-638.

7. The solar control laminate of claim 6, wherein the polymeric sheet comprises one or more materials selected from the group consisting of poly(ethylene-co-vinyl acetate), ethyl acrylic acetate, ethyl methacrylate, metallocene-catalyzed polyethylene, poly(vinyl chloride), ISD resins, polyurethanes, acoustic modified poly(vinyl chloride), poly(vinyl butyral), and acoustic modified poly(vinyl butyral).

8. The solar control laminate of claim 7, wherein the polymeric sheet comprises poly(ethylene-co-vinyl acetate) or poly(vinyl butyral).

9. The solar control laminate of claim 1, wherein the polymeric sheet comprises a material with a modulus of about 20,000 psi (138 MPa) to about 100,000 psi (690 MPa) as measured by ASTM Method D-638.

10. The solar control laminate of claim 9, wherein the polymeric sheet comprises an ethylene acid copolymer composition or an ionomer derived from an ethylene acid copolymer composition.

11. The solar control laminate of claim 10, wherein the polymeric sheet comprises an ethylene acid copolymer.

12. The solar control laminate of claim 11, wherein the ethylene acid copolymer comprises from about 0.1 weight percent to about 30 weight percent of one or more alpha, beta-ethylenically unsaturated acid comonomers selected from the group consisting of acrylic acid, (meth)acrylic acid, itaconic acid, maleic acid, maleic anhydride, fumaric acid, and monomethyl maleic acid.

13. The solar control laminate of claim 12, wherein the ethylene acid copolymer comprises acrylic acid, (meth) acrylic acid, or a combination of acrylic acid and (meth) acrylic acid.

14. The solar control laminate of claim 11, wherein the acid groups of the ethylene acid copolymer are at least partially neutralized and the cations comprise sodium cations, zinc cations, or a mixture of sodium cations and zinc cations.

15. The solar control laminate of claim 11, wherein the ethylene acid copolymer comprises one or more comonomers selected from the group consisting of methyl (meth)acrylate, butyl (meth)acrylate, glycidyl (meth)acrylate, vinyl acetate, and mixtures of two or more of methyl (meth)acrylate, butyl (meth)acrylate, glycidyl (meth)acrylate, and vinyl acetate.

16. The solar control laminate of claim 1, comprising the at least one additional layer.

17. The solar control laminate of claim 16, wherein the at least one additional layer is a sheet comprising or produced from poly(ethylene-co-vinyl acetate), ethyl acrylic acetate, ethyl methacrylate, metallocene-catalyzed polyethylene, poly(vinyl chloride), ISD resins, polyurethanes, acoustic modified poly(vinyl chloride), poly(vinyl butyral), acoustic modified poly(vinyl butyral), ethylene acid copolymer composition and an ionomer derived from an ethylene acid copolymer composition.

18. The solar control laminate of claim 16, wherein the at least one additional layer is a rigid sheet comprising or produced from glass, window glass, plate glass, silicate glass, sheet glass, float glass, colored glass, specialty glass, glass coated with one or more sputtered metals, glass coated with ATO and/or ITO, E-glass, polycarbonate, acrylics, polyacrylate, cyclic polyolefins, a metal plate, or a ceramic plate.

19. The solar control laminate of claim 16, wherein the rigid sheet is transparent.

* * * * *